United States Patent
Zimmerman et al.

(10) Patent No.: US 11,315,090 B1
(45) Date of Patent: *Apr. 26, 2022

(54) SYSTEM AND METHOD FOR AUTOMATED OPTIMIZATION OF FINANCIAL ASSETS

(71) Applicant: Six Trees Capital LLC, New York, NY (US)

(72) Inventors: Gary E. Zimmerman, New York, NY (US); Richard D. Wu, Chicago, IL (US); Gabriel Jorge Gironda, Austin, TX (US)

(73) Assignee: Six Trees Capital LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,150

(22) Filed: Apr. 16, 2020

Related U.S. Application Data

(60) Continuation of application No. 15/678,453, filed on Aug. 16, 2017, now Pat. No. 10,657,504, which is a division of application No. 14/606,931, filed on Jan. 27, 2015, now Pat. No. 10,268,995.

(60) Provisional application No. 61/932,495, filed on Jan. 28, 2014.

(51) Int. Cl.
  *G06Q 20/10*  (2012.01)
  *G06Q 20/22*  (2012.01)
  *G06Q 40/08*  (2012.01)

(52) U.S. Cl.
  CPC ........... *G06Q 20/10* (2013.01); *G06Q 20/227* (2013.01); *G06Q 40/08* (2013.01)

(58) Field of Classification Search
  CPC .............................. G06Q 20/10; G06Q 20/22
  See application file for complete search history.

(56) References Cited

U.S. PATENT DOCUMENTS

| | | | | |
|---|---|---|---|---|
| 8,495,720 | B2* | 7/2013 | Counterman | G06F 21/40 455/433 |
| 10,268,995 | B1* | 4/2019 | Zimmerman | G06Q 20/227 |
| 2008/0249947 | A1* | 10/2008 | Potter | G06Q 20/3674 705/67 |
| 2008/0319887 | A1* | 12/2008 | Pizzi | G06Q 40/02 705/35 |
| 2014/0337636 | A1* | 11/2014 | Adams | G06F 21/32 713/186 |
| 2014/0351146 | A1* | 11/2014 | Johnson | G06Q 20/12 705/71 |
| 2015/0066719 | A1* | 3/2015 | Agrawal | G06Q 40/02 705/35 |

* cited by examiner

*Primary Examiner* — Robert R Niquette
(74) *Attorney, Agent, or Firm* — Wiggin and Dana LLP; Rikesh P. Patel

(57) ABSTRACT

A financial management network is disclosed for optimizing interest return and/or deposit insurance coverage among a plurality of online accounts that may include one or more savings accounts and a checking account, by automatically allocating and transferring funds among the accounts without intervention of the account holder, in accordance with constraints that may be set by the financial management network, account holder, the account holder's financial advisor, and/or imposed by the associate financial institutions holding the accounts.

10 Claims, 14 Drawing Sheets

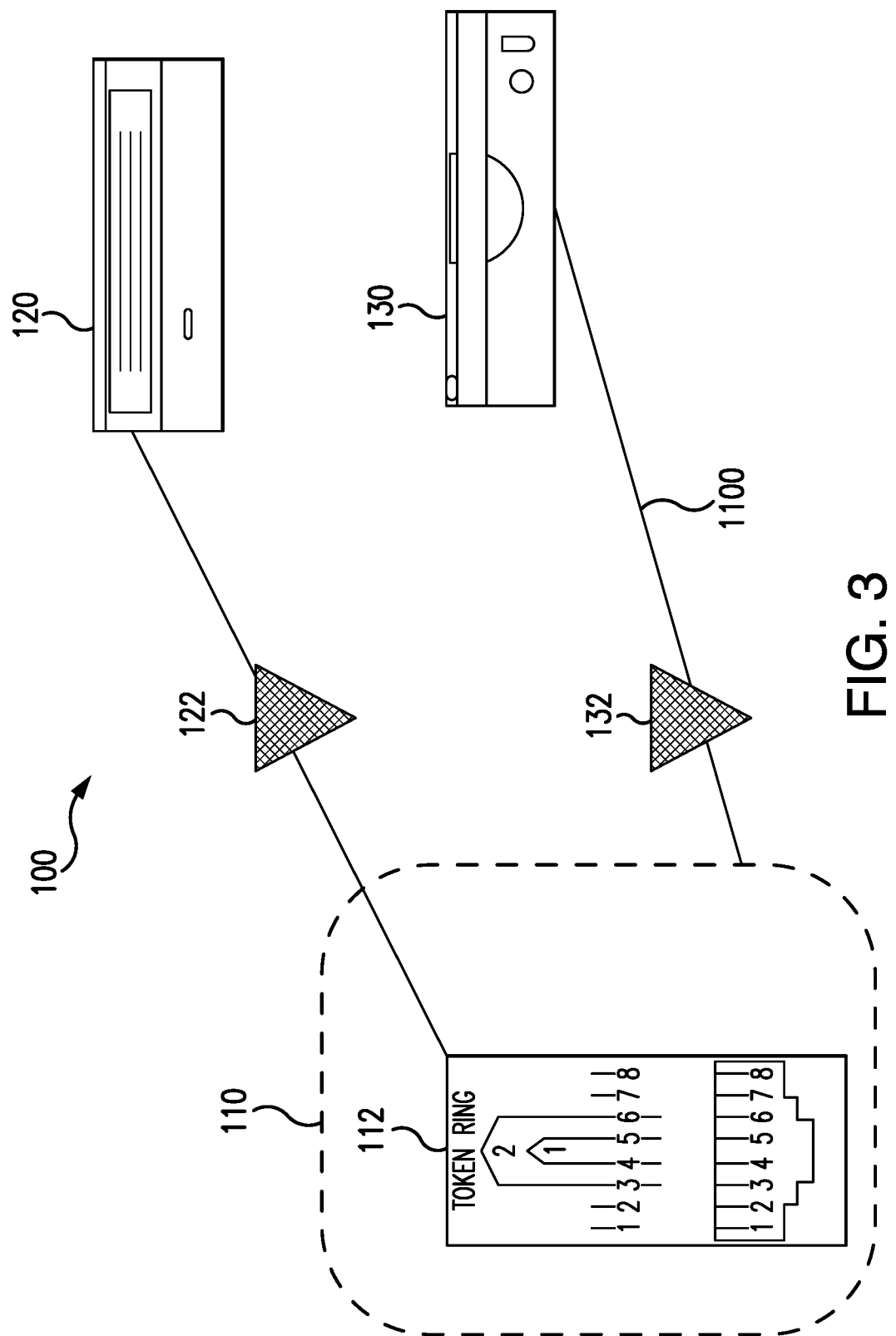

| Primary Checking ◇ | Transfer Funds | Optimized Savings |
| --- | --- | --- |
| citi Citibank Min. Balance of $15,000 $12,475.77 As of November 24th | ⇆ | $547,989.52 As of November 24th Next optimization begins N/A |

| | BANK | RATE | BALANCE |
| --- | --- | --- | --- |
| 1 | Barclays | 0.90% | $99,971.54 ◇ As of November 24th |
| 2 | GE Capital Bank | 0.90% | $245,571.58 ◇ As of November 24th |
| 3 | Ally Bank | 0.86% | $1,009.94 ◇ As of November 24th |
| 4 | American Express Bank, FSB | 0.85% | $200,432.05 ◇ As of November 24th |
| 5 | Capital One 360 | 0.75% | $1,004.41 ◇ As of November 24th |

SYSTEM AND METHOD FOR AUTOMATED OPTIMIZATION OF FINANCIAL ASSETS

The present application is a Continuation of U.S. patent application Ser. No. 15/678,453 filed Aug. 16, 2017 and entitled "SYSTEM AND METHOD FOR AUTOMATED OPTIMIZATION OF FINANCIAL ASSETS." U.S. Ser. No. 15/678,453 claims priority to U.S. Ser. No. 14/606,931 filed Jan. 27, 2015, bearing the same title. U.S. Ser. No. 14/606,931 claims priority to provisional application Ser. No. 61/932,495 filed on Jan. 28, 2014, bearing the same title. The contents of U.S. Ser. No. 15/678,453, U.S. Ser. No. 14/606,931 and U.S. 61/932,495 are hereby incorporated by reference herein in their entirety.

FIELD

The present invention generally relates to systems, product programs and methods of using the same for optimizing the distribution of financial assets among financial accounts via a fully-automated approach that does not require user intervention on an ongoing basis. The present invention further relates to systems, product programs, and methods of using the same for automated management of financial assets, including the transfer of financial assets between financial accounts according to a set of rules that optimize the distribution of the financial assets among those accounts according to certain criteria, and subject to certain constraints.

BACKGROUND

In many economies, financial institutions, for example, banks, brokerage firms and credit unions, offer account holders interest payments at set interest rates for maintaining financial assets in accounts operated by such financial institutions. However, these set interest rates may vary over time depending on overall financial markets and each financial institution's need for deposits, and may differ from one financial institution to another. The current scheme of interest return on financial assets stored in various financial accounts provides challenges to an account holder in managing multiple accounts and optimizing the allocation of his or her financial assets among such accounts to obtain the best overall interest return, while simultaneously maximizing the degree to which such assets are kept safe via diversification and deposit insurance schemes, such as that provided by the Federal Deposit Insurance Corporation (FDIC).

For example, many traditional "brick and mortar" financial institutions offer personal checking accounts at comparatively low or zero interest rates, but provide substantially instantaneous access to financial assets in those checking accounts. In today's world of electronic banking, such checking accounts may be configured to allow for ingoing and/or outgoing transfer of financial assets to and from other accounts via batch electronic transfers such as Automated Clearing House (ACH) transfers or wire transfers such as FedWire transfers. One feature of ACH transfers is that they may also be provided with mechanisms to reverse erroneous or unauthorized transfers within a designated period such as 60 days.

In contrast to low or zero interest bearing checking accounts, other financial institutions, such as online banking institutions, may be attractive in that they offer to a user savings accounts with higher interest rates than their "brick and mortar" counterparts, but sometimes place restrictions on access to financial assets by a user, for example, by requiring a waiting period for funds to clear or transfer, or by placing limitations on the method by which such funds may be transferred or accessed. At present, many of these online banking institutions allow for funds to be transferred into or out of their online savings accounts via ACH transfers, which they provide to their customers free of charge. In some cases, online banking institutions also provide for the ability to send or receive funds via wire transfers.

Since interest rates may be subject to frequent and/or unpredictable fluctuations among various financial institutions, account holders must continuously monitor, plan, and/or effect transfers of financial assets among their various accounts in order to gain the maximum benefit of interest rates offered across different financial accounts at a given time. Moving funds from one account to another can often require multiple steps, careful coordination, and mathematical adjustments to the amounts being transferred due to the time that elapses in the process of making such funds transfers.

Prior attempts to optimize returns on financial assets using, for example, automated cash sweep systems, have sought to allocate cash across multiple accounts so as to provide increased FDIC insurance protection, but not necessarily to optimize interest yield.

For example, there are prior art cash sweep systems that operate as "brokered deposit" systems. Such brokered deposit systems involve deposits that are sold from bank to bank. Since such deposits are characterized as a lower tier of capital from a regulatory perspective, optimization systems involving such brokered deposits are less attractive, since banks are only willing to pay below-market interest rates for such deposits.

Among the inventive concepts incorporated in the system described herein, the optimization of interest earnings among a user's accounts is structured differently from such brokered deposit systems. Since i) the user's accounts are conventional deposit accounts that they hold directly in their own names, ii) the banks cannot dictate the extent to which they receive funds, and iii) the banks do not pay a fee to receive such funds, these deposits are not considered by the regulators to be "brokered." As such, these deposits receive a higher interest rate than funds that are subject to brokered deposit systems. Optimizing the distribution of financial assets among such conventional deposit accounts thus provides higher yields to the user, while simultaneously affording the banks more favorable regulatory treatment as it relates to these deposits.

Prior art sweep systems using brokered deposit accounts are also deficient in that they may not provide full insurance to the account holder/user, since the account holder/user may have outside deposits or CDs at the same institutions that serve as program banks under the brokered deposit system, and overlapping deposits may result in the user inadvertently exceeding the deposit insurance coverage limits. On the other hand, the invention disclosed herein permits the account holder/user to easily and directly control overall limits on a per bank basis, thereby providing control and reducing the likelihood that there will be uninsured deposits.

Still further, in prior art cash sweep systems, the accounts are not directly held by the user and therefore cannot be directly accessed by the user without coordination with the cash sweep administrator. Further, if the main bank controlling, for example, the brokered deposit network were to fail, the user would lose access to the funds being held by the related banks involved in the brokered deposits for a period of time.

Accordingly, there is a need for a financial management system that can avoid the deficiencies of prior art systems. These deficiencies are obviated by the invention described herein, in which all accounts are not only optimized, but at all times are directly accessible to the user/account holder without needing to coordinate with a third party.

The financial management system disclosed herein can determine the optimal allocation of financial assets across different financial accounts set up by a user/account holder, and then instruct or facilitate the transfer of financial assets among multiple accounts to allocate an account holder's financial assets in an optimal manner so that the user receives the maximum available amount of interest return on the financial assets disposed across the various accounts, subject to the constraints imposed by simultaneously maximizing FDIC insurance coverage, or any other such constraints that may be set by the user or administrator of the financial management network.

The disclosed financial management system can be configured to allocate an account holder's financial assets among the different accounts to be optimized subject to additional or alternative factors or constraints, such as keeping assets within insurance limits set by deposit insurance schemes or other purchased insurance products, keeping within transfer limits imposed by the banks and/or minimum and/or maximum account balances as may be required by financial institutions or desired by the user, maintaining checking account balances at specified deposit levels and/or to provide a user with other advantages that different types of financial accounts have to offer.

The disclosed financial management system can operate in an at least a partially automated manner to effect such financial transfers with little or no monitoring and/or intervention by the user/account holder and/or at no marginal cost to the user per transfer effected.

As detailed further herein, a unique and inventive concept of the underlying architecture of the system disclosed herein is that any transfers of funds required to achieve optimized interest returns originate as requests made by online banks through the Automated Clearing House (ACH) for either an ACH credit to the user's linked checking account or as an ACH debit that pulls funds from the checking account.

Significantly, among the many inventive concepts included in the disclosed system, the checking account at the hub of the disclosed system is passive in that the checking account does not control the flow of funds into or out of the checking account. Advantageously, this arrangement avoids funds transfer limitations often imposed by brick-and-mortar banks, as well as fees that are normally charged for funds transfers from a checking account. Because transfers are handled by the online banks who assume the costs for such ACH transfers, there are no costs incurred by the user of the disclosed system.

SUMMARY

As used herein and as will be clear from the context, the term "account" may refer to the account holder's account per se, or to the associated physical interface that permits the account to be electronically accessed by either the user or the financial management system disclosed herein. Further, the terms "user," "client," "account holder," "customer," and "member" are used interchangeably in this disclosure According to an exemplary embodiment, a financial management system is disclosed, comprising a first financial management network that connects a checking account, a first savings account, and a second savings account. The financial management network comprises at least one data store, a processor and a product program for implementing the desired transactions, as further discussed herein. The financial management network, checking account, first savings account, and second savings account are each interconnected along a data network.

In an exemplary embodiment, the checking account is associated with a first interest rate.

In an exemplary embodiment, the first savings account is associated with an interest rate that is higher than the first interest rate.

In an exemplary embodiment, the second savings account is associated with an interest rate that is equal to or higher than the first interest rate.

In an exemplary embodiment, the processor is configured to apply one or more rules stored in the at least one data store to instruct the first savings account and/or the second savings account to initiate a transfer of financial assets between the respective first savings account and/or second savings account and the checking account.

In an exemplary embodiment, the one or more rules determine an optimal allocation of financial assets among one or more of the checking account, first savings account, and second savings account.

In an exemplary embodiment, the one or more rules determine an allowable amount of financial assets in one or more of the checking account, first savings account, and second savings account.

In an exemplary embodiment, the one or more rules determine an allowable amount of financial assets to be transferred between one or both of the first savings account and second savings account and the checking account.

In an exemplary embodiment, the one or more rules determine an allowable amount of transfers of financial assets between one or both of the first savings account and second savings account and the checking account over a given period of time.

In an exemplary embodiment, the at least one data store is configured to retain credentials for accessing one or more of the checking account, first savings account, and second savings account.

In an exemplary embodiment, the credentials include one or more of: a login name, a login password, an account number, a routing number, a name, an address, a telephone number, an email address, information relating to a third party financial institution, a PIN number, and answers to a one or more predetermined questions.

In an exemplary embodiment, the processor is configured to determine an allocation of financial assets among the checking account, first savings account, and second savings account, based upon a relative priority of the checking account, first savings account, and second savings account subject to the one or more rules.

According to an exemplary embodiment, a financial management network is disclosed that utilizes links that a user/account holder has established between a checking account, and one or more savings accounts. Such links are made accessible to the financial management system which can then instruct transfers between the linked accounts in the manner disclosed herein.

In an exemplary embodiment the financial management network comprises at least one data store, and one or more processors for implementing a product program as further disclosed herein. Each of the financial management network, checking account, and one or more savings accounts are interconnected along a data network.

In an exemplary embodiment, the one or more processors are configured to apply one or more rules stored in the at least one data store to instruct at least one savings account of the one or more savings accounts to initiate a transfer of financial assets between the checking account and the respective savings account.

In an exemplary embodiment, the one or more rules determine an optimal allocation of financial assets among the checking account and the one or more savings accounts.

According to an exemplary embodiment, a method of using a financial management system to optimize financial assets is disclosed, and comprises: (a) providing a financial management network comprising a data store, a processor and a product program; (b) linking a checking account to the financial management network; (c) linking a first savings account to the checking account and to the financial management network; (d) linking a second savings account to the checking account and to the financial management network; (e) providing one or more rules to the product program; and (f) initiating an optimization algorithm in which the product program determines an optimal allocation of financial assets among the checking account, first savings account, and second savings account according to a relative priority assigned to the checking account, first savings account, and second savings account subject to the one or more rules.

In an exemplary embodiment, the method further comprises the step of instructing the transfer of financial assets between one or more of the first savings account and second savings account and the checking account according to an optimization algorithm.

In an exemplary embodiment, the method further comprises the step of instructing the transfer of financial assets to the checking account from one or more of the first savings account and second savings account according to the optimization algorithm.

In an exemplary embodiment, the method further comprises the step of instructing the transfer of financial assets to one or more of the first savings account and second savings account from the checking account according to the optimization algorithm.

In an exemplary embodiment, the optimization algorithm determines a relative priority among the savings accounts at least partially based upon an interest rate associated with each of the first savings account and second savings account.

In an exemplary embodiment, the optimization algorithm determines the relative priority based at least partially on one or more factors including: an objective customer service rating, a subjective customer service rating, an associated fee, an account limit, a transfer limit, and historical interest rates or historical interest rate volatility.

According to an exemplary embodiment, a method of using a financial management system to optimize financial assets is disclosed, and comprises: (a) providing a financial management network comprising at least one data store, one or more processors and a product program; (b) linking a checking account to the financial management network; (c) linking one or more savings accounts to the checking account and to the financial management network; (d) providing one or more rules to the product program; and (e) initiating an optimization algorithm in which the product program determines an optimal allocation of financial assets among the checking account and the one or more savings accounts according to a relative priority assigned to the checking account and/or the one or more savings accounts subject to the one or more rules, and (f) individually instructing some or all of a user's online savings banks to send cash to the checking account and/or pull cash from the checking account.

BRIEF DESCRIPTION OF THE DRAWINGS

Various exemplary embodiments of this invention will be described in detail, with reference to the following figures, wherein:

FIG. 3 is a schematic diagram of the financial management network of FIG. 1;

FIG. 4C is schematic view of another exemplary embodiment of the image layer of the client interface shown in FIG. 1;

FIG. 6B-1 and FIG. 6B-2 together illustrate a flow chart of the area of detail identified in FIG. 6A as S203;

FIG. 6D-1 and FIG. 6D-2 together illustrate a flow chart of the area of detail identified in FIG. 6A as S208.

DETAILED DESCRIPTION

Figure 1:
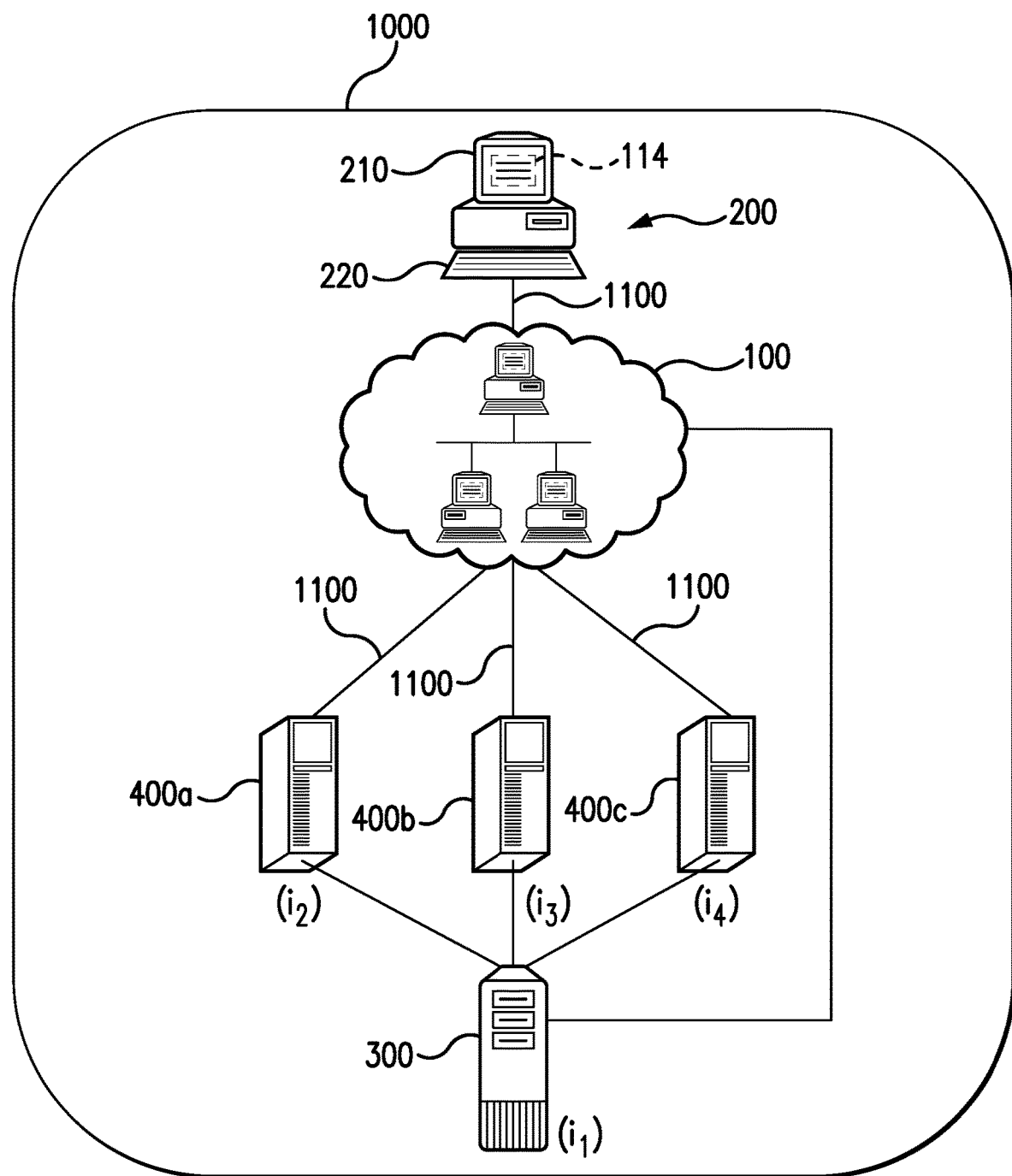
FIG. 1 is a schematic diagram of a financial management system according to an exemplary embodiment of the present disclosure.

In embodiments, the present invention generally relates to systems, product programs, and methods of using the same for managing multiple financial asset accounts, determining the optimal allocation of financial assets across financial accounts and the automated transfer of financial assets between a first financial account and at least one second financial account so that the financial assets are allocated in an optimal manner among the financial accounts according to certain criteria and without ongoing user intervention. As used herein, the term financial account will be understood to include a collection of one or more units of a financial asset having an associated monetary value, such as a currency. Financial accounts may be collections of financial assets that are held, maintained, and/or otherwise managed by a financial institution, such as a bank, brokerage firm or credit union. In embodiments, a financial account may be, for example, a checking account or savings account or money market fund account. As described herein, an interest rate refers to a percentage increase, or in the event of a negative interest rate, a percentage decrease, of the value of the financial assets in an account at set intervals of time, effected via deposits to the financial account called interest payments. Interest payments in financial accounts such as checking and savings accounts may be in the form of, for example, cash. In embodiments, interest payments may be in a form dependent upon the type of financial account to which they are applied, for example, yields in the form of coupons on bonds and/or bills in the case of a money market fund.

In embodiments, the present invention further relates to systems, product programs, and methods of using the same for allocating and transferring financial assets between a first financial account and at least a second financial account according to an optimization algorithm so that a user's financial assets are distributed across the financial accounts in a manner such that the financial assets receive the maximum amount of interest payments available as determined by the respective interest rates of the financial accounts within boundary conditions or constraints that may be user-selected and/or imposed by a financial institution or other body, such as the system administrator.

In embodiments, a boundary condition may be a requirement imposed by the financial institution that a minimum amount of assets be maintained in in one or more of accounts 300, 400a, 400b, 400c, e.g., a minimum account balance. In other embodiments, such boundary condition could relate to a minimum account balance that a user desires to keep in his/her account, irrespective of the requirements imposed by the financial institution. A minimum account balance may be, for example, $1 USD. Such a boundary condition may be placed on one or more of accounts 300, 400a, 400b, 400c, for, example, by the user, by a financial institution, or by a default setting of product program 110, and may differ across different accounts.

In embodiments, a boundary condition may be a maximum amount of financial assets in one or more of accounts 300, 400a, 400b, 400c, e.g., a maximum account balance. In embodiments, a maximum account balance may correspond to a financial asset limit independent of financial management system 1000, for example, a government or third-party insurance limit, such as the maximum FDIC insurance limit (which currently stands at $250,000 USD, but which may change from time to time). In such embodiments, the boundary condition may be set at a margin of safety below the reference financial asset limit, for example, $249,500 USD in the case of the FDIC insurance limit for an individual account, such that principal plus accrued interest remain below the FDIC insurance limit. In embodiments, such a boundary condition may correspond to a maximum financial asset limit as specified by a third-party financial institution, for example, $1,000,000. Accordingly, such a boundary condition may be placed on one or more of accounts 300, 400a, 400b, 400c, for, example, by the user, by a financial institution, or by a default setting of product program 110, and may differ across different accounts. In embodiments, such a boundary condition may correspond to the user's maximum desired balance, which may be higher or lower than the default boundary condition set by product program 110.

In embodiments, a boundary condition may be a maximum and/or minimum amount of financial assets that may be transferred into and/or out of a given financial account, e.g., a transfer limit. In embodiments, such a boundary condition may apply to either or both incoming and outgoing transfers of financial assets on anyone of accounts 300, 400a, 400b, and 400c. In embodiments, the boundary condition may apply to any given period of time, for example, one day, one week, or one month, to name a few. In embodiments, the boundary condition may apply to a limit on ingoing and/or outgoing transfers occurring in a single transfer of financial assets, for example, a maximum outbound transfer of $150,000 USD, or a maximum inbound transfer of $250,000 USD, or a maximum daily transfer limit of $500,000 USD, and may differ across different accounts.

In embodiments, a boundary condition may be a maximum number of transfers of financial assets to be initiated over a given period of time. In embodiments, such a boundary condition may correspond to a limit set by a financial institution, such as a maximum of six transfers with respect to a given financial account before associated fees are incurred.

In embodiments, a boundary condition may depend upon a different variable, for example, a minimum difference in interest rates associated with two financial accounts and/or a minimum difference in financial assets in two financial accounts before a transfer of financial assets there between is initiated.

Turning to FIG. 1, an exemplary embodiment of a financial management system is generally designated 1000. Financial management system 1000 may be an interconnection of elements that comprise at least a financial management network 100, a client interface 200, and interfaces to a first financial account, such as a checking account 300, and one or more second financial accounts, such as savings accounts 400a, 400b, 400c. Although the presently-described exemplary embodiment includes three savings accounts, it will be understood that, in embodiments, a financial management system 1000 may be linked to any number of savings accounts and/or other types of financial accounts through their associated computer interfaces.

Financial management network 100, client interface 200, account interfaces 300, 400a, 400b, 400c, and/or any component thereof, may be interconnected along one or more electronic data networks 1100, for example, a wired and/or wireless data communication system such as the World Wide Web, a mobile data network, and/or local intranet, to name a few. In embodiments, a financial management system may be an interconnection of elements that comprise any number, combination, and/or separation of elements described above.

Financial management network 100 may include web servers, application servers and databases as described herein, for implementing a multi-tier web application that includes access and security restrictions between the web servers, application servers and databases. For example, the application servers and databases can be accessed on the internet only by system administrators using specialized software and virtual private networks that communicate using SSL certificates with tightly controlled access lists.

As described further herein, financial management system 1000 is configured so that financial management network 100 periodically analyzes changing conditions among the one or more of savings accounts 400a, 400b, 400c, and checking account 300 that may impact the optimum allocation of funds among the accounts. For example, interest rates payable by the accounts, FDIC insurance limits, maximum/minimum account limits, transfer limits and the like may periodically change for some or all of the accounts. Such changing conditions are periodically monitored by the financial management network 100 to determine the optimal allocation of a user's financial assets among checking account 300 and savings accounts 400a, 400b, 400c to receive the benefit of the highest interest rates available subject to any or all of the constraints described above in any combination or separation, subject to any and/or all of the boundary conditions described above in any combination or separation. Such optimal allocation may be made in accordance with a particular schedule or automatically when a changing condition occurs that impacts on the optimal allocation.

The financial management network may then instruct one or more of the interfaces for savings accounts 400a, 400b, 400c to initiate a transfer of financial assets indirectly there between, through a corresponding crediting and debiting action on checking account 300 as an intermediary to achieve this optimized distribution of the user's financial assets.

In an exemplary embodiment, this transfer of financial assets occurs as a two-step process: first, savings account 400a is instructed to initiate a transfer of financial assets $M_1$, into checking account 300 (through a debiting action). In a separate, second step, savings account 400c is instructed to initiate a transfer of financial assets $M_1$ into savings account 400c from the checking account 300 (through a crediting action). Thus, all transfers (in both directions) are initiated by the savings accounts and do not require action on the part of the checking account. Using this particular two-step arrangement in which the checking account is passive permits savings of fees that might otherwise be incurred by transfers initiated by the checking account and avoids other potential limitations regarding the number and size of transfers that may be invoked by the banks.

The above-described processes of financial management network 100 may be at least partially automated so that a user may attain the benefits of an optimized allocation of his or her financial assets across savings accounts 400a, 400b, 400c, without spending a substantially increased amount of time and effort monitoring these accounts.

In embodiments, financial management system 1000 may include any number of savings accounts. Accordingly, in embodiments, financial management system 1000 may link a single savings account and a single checking account. In embodiments, financial management system may include more than one checking account. In embodiments, financial management system 1000 may include any number of financial accounts, including, for example, checking accounts, savings accounts, brokerage accounts or money market fund accounts in any combination or separation.

In the exemplary embodiment shown, checking account 300 may be maintained by a traditional banking institution, and savings accounts 400a, 400b, and 400c may be maintained by respective online banking institutions. Accordingly, checking account 300 may be a financial account with a low or zero value interest rate it, and savings accounts 400a, 400b, and 400c may be a financial account with respective interest rates $i_2$, $i_3$, $i_4$ that are each greater than the interest rate $i_1$ of checking account 300. In this manner, financial assets stored in savings accounts 400a, 400b, and/or 400c may be supplemented by interest payments at a greater percentage than would be earned by a corresponding amount of financial assets stored in the checking account 300 during a comparative interval of time. Interest rates $i_2$, $i_3$, $i_4$ may each be substantially similar to one another, may have different values, and/or may fluctuate over time so that interest rates $i_2$, $i_3$, and $i_4$, do not necessarily have a constant relative relationship. In embodiments, checking account 300 and savings accounts 400a, 400b, 400c may be different financial accounts at the same third party institution that have different associated interest rates $i_2$, $i_3$, $i_4$. It will be understood that, in embodiments, accounts 300, 400a, 400b, 400c may be different types of financial accounts and may use different currencies. For example, each account may be a non-commercial account, a commercial account, a trust account, an escrow account, a non-profit, foundation or endowment account, or any other type of account that can be accessed by the financial management network 100 in accordance with this disclosure.

Each of accounts 300, 400a, 400b, 400c includes financial assets to which a user/account holder has access, and to which other individuals or entities may have access when authorized by a user/account holder. A user may include, for example, a single account owner, one or more joint account owners, or one or more persons acting on behalf of an at least partial account holder, such as a proxy or trustee, financial advisor, private wealth manager, and/or an automated system acting upon instructions provided by a user, being one or more of the above, to name a few. For example, the user might be an individual, a couple, a financial advisor administering the system on behalf of an individual or a couple, or a CFO or treasurer of a company who has authority to act on behalf of that entity's accounts.

Figure 2:
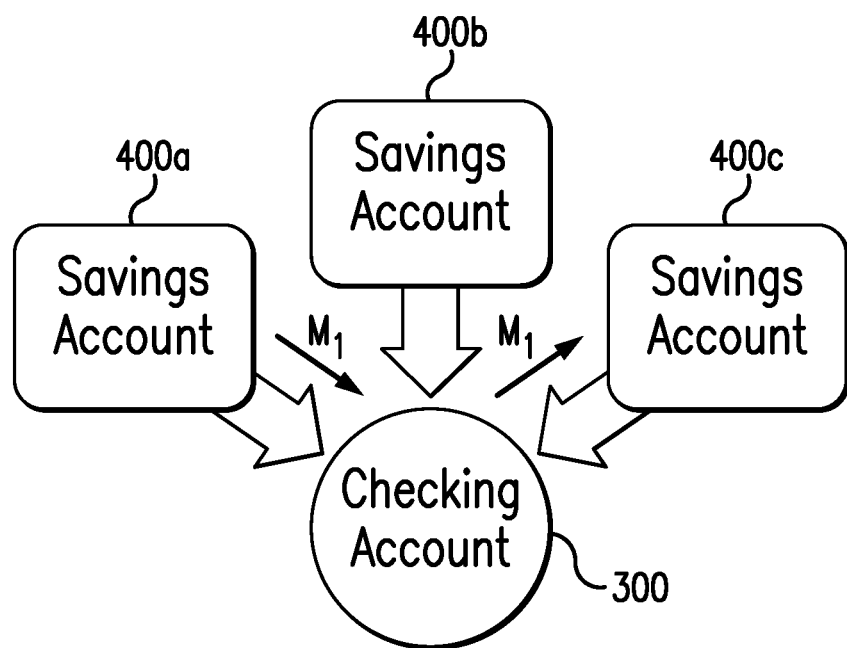
FIG. 2 is a schematic diagram illustrating linked financial accounts in the financial management system of FIG. 1.

As shown, savings accounts 400a, 400b, 400c are linked across data network 1100 through checking account 300. Referring additionally to FIG. 2, checking account 300 is linked between each of accounts 400a, 400b, 400c so that checking account 300 may act as a hub through which financial assets may be transferred indirectly between savings accounts 400a, 400b, 400c. The savings accounts may be viewed as connected to the checking account hub as various spokes. By using such hub-and-spoke architecture, rather than making transfers directly between savings accounts, the disclosed system is able to avoid limitations that may be imposed on transfers from savings account (e.g., certain banking regulations in the United States currently limit savings accounts to no more than 6 outbound transfers per month).

Furthermore, by using such hub-and-spoke architecture in which transfers are made through previously-verified ACH links between the checking account at the hub and the savings accounts at the spokes, the presently disclosed system is highly secure. In accordance with this architecture and as disclosed herein, the financial management network 100 does not originate funds transfers, but only acts as agent for the user/account holder, providing instructions on the user's behalf to the user's savings banks to make the funds transfers along ACH conduits that the user has setup with each online account and whose security has been previously verified by the user and the banks. For example, it is not possible for someone who may breach other robust security measures built into the disclosed financial management system 1000 and/or financial management network 100 to link their own online account and syphon funds away from the user/account holder, since the breaching party will not be able to complete the trial deposit verification procedures currently in place by banks for confirming the secure linking together of new accounts, since access to the user's checking account is also required to confirm trial deposits (or other mechanisms typically used to confirm rightful ownership of accounts).

Accordingly, financial assets may be transferred between savings accounts 400a, 400b, 400c by using checking account 300 as an intermediary. For example, an amount of financial assets M, may be transferred between savings account 400a and savings account 400c in a two-step process: in a first step, financial assets $M_1$, are transferred from savings account 400a to checking account 300; in a separate, second step, financial assets M, are transferred to savings account 400c from checking account 300. A lapse in time between the first step and second step described above may be associated with, for example, the length of time that the checking account 300 or an intermediary funds transfer network, such as the ACH network or FedWire, takes to process the transfer in the first step, along with the amount of time that the system described herein takes to i) confirm that the first step has been completed successfully and ii) refresh user account balances and recalculate the required funds transfers for the second step, taking into account any changes in relevant account balances between the first and second step.

Each of accounts 300, 400a, 400b, 400c may retain financial assets so that a substantially large number of possible distributions of a user's financial assets is possible. As described above, it may be desirable to redistribute financial assets among savings accounts 400a, 400b, 400c, for example, to gain the benefit of a higher interest rate offered on one account, or to help maintain the level of financial assets in some or all of the accounts above a minimum value or below a maximum value, for example, to stay below an insurance program limit, such as FDIC insurance, or to stay above a minimum balance requirement (either for the avoidance of account fees or to keep an account open).

Accordingly, financial management network 100 is configured to implement an optimization algorithm to provide a user with the optimum distribution of financial assets across savings accounts 400a, 400b, 400c and checking account 300 so that the user's financial assets in financial management network 100 are eligible for the greatest amount of interest payments offered on savings accounts 400a, 400b, 400c and checking account 300, subject to the aforementioned constraints.

In embodiments, financial management network 100 may be at least partially automated so that financial management network 100 can send instructions to implement financial transfers between accounts 300, 400a, 400b, 400c without requiring direct input from a user. In such embodiments, financial management network 100 may be governed by a set of rules or conditions chosen by the user and/or persons or entities authorized by the user, including the system administrator. As described further herein, financial management network may be provided with a variable level of automation so that a user is afforded a degree of direct control over the operation of financial management network 100.

Still referring to FIG. 1, client interface 200 is an access point configured to transmit data between a user and at least financial management network 100 along data network 1100. In embodiments, client interface 200 may additionally be configured to transmit data directly between a user and checking account 300 and/or savings accounts 400a, 400b, and/or 400c. In embodiments, client interface 200 may be, for example, a desktop or terminal computer, or may be a mobile device incorporating a computer such as a smartphone, PDA, wearable computer, laptop computer, or tablet computer. It will be understood that any device capable of connecting to data network 1100 may be configurable as a suitable client interface.

Client interface 200 includes a display 210 that is configured to provide data from financial management network 100 in a format visually accessible to a user, such as letters, numbers, symbols, and/or graphics, to name a few. In embodiments, display 210 may be, for example, a video monitor, a screen, or a projector. Client interface 200 also includes at least one input device 220 through which a user may input data to at least financial management network 100 along data network 1100. In embodiments, input device 220 may be, for example, a keyboard, mouse, keypad, touchpad, voice recognition program, motion sensor and/or other input device capable of sending data to financial management network 100 through data network 1100 in response to a corresponding physical input and/or visual input and/or audible input. In embodiments, a client interface 200 may include additional and/or alternative features for the receipt and input of data there through. Still further, in embodiments, the financial management network 100 may provide information and receive instructions via an API, for example connected to the computer system of a financial advisor, rather than via human input. In embodiments, a display and input device may together be provided on a client interface, for example, through one or more capacitive touchscreens. In this regard, a user may access and/or input information directly to financial management network 100, checking account 300, and/or savings account 400, and/or may indirectly access and/or input information to checking account 300 and/or savings account 400 via financial management network 100 through client interface 200.

Turning to FIG. 3, financial management network 100 may comprise a product program 110, a credential data store 120, and rule data store 130. In embodiments, financial management network 100 may include a single data store, or any number, combination, and/or separation of elements described above.

Product program 110 may be an application or software operable via one or more processors 112. In embodiments, product program 110 may comprise a computing environment having one or more real and/or virtual data servers to provide network-based services to a user, such as a cloud computing environment, and provides a hub that is connected between credential data store 120, rule data store 130, client interface 200, checking account 300, and savings accounts 400a, 400b, 400c along data network 1100.

Figure 4A:
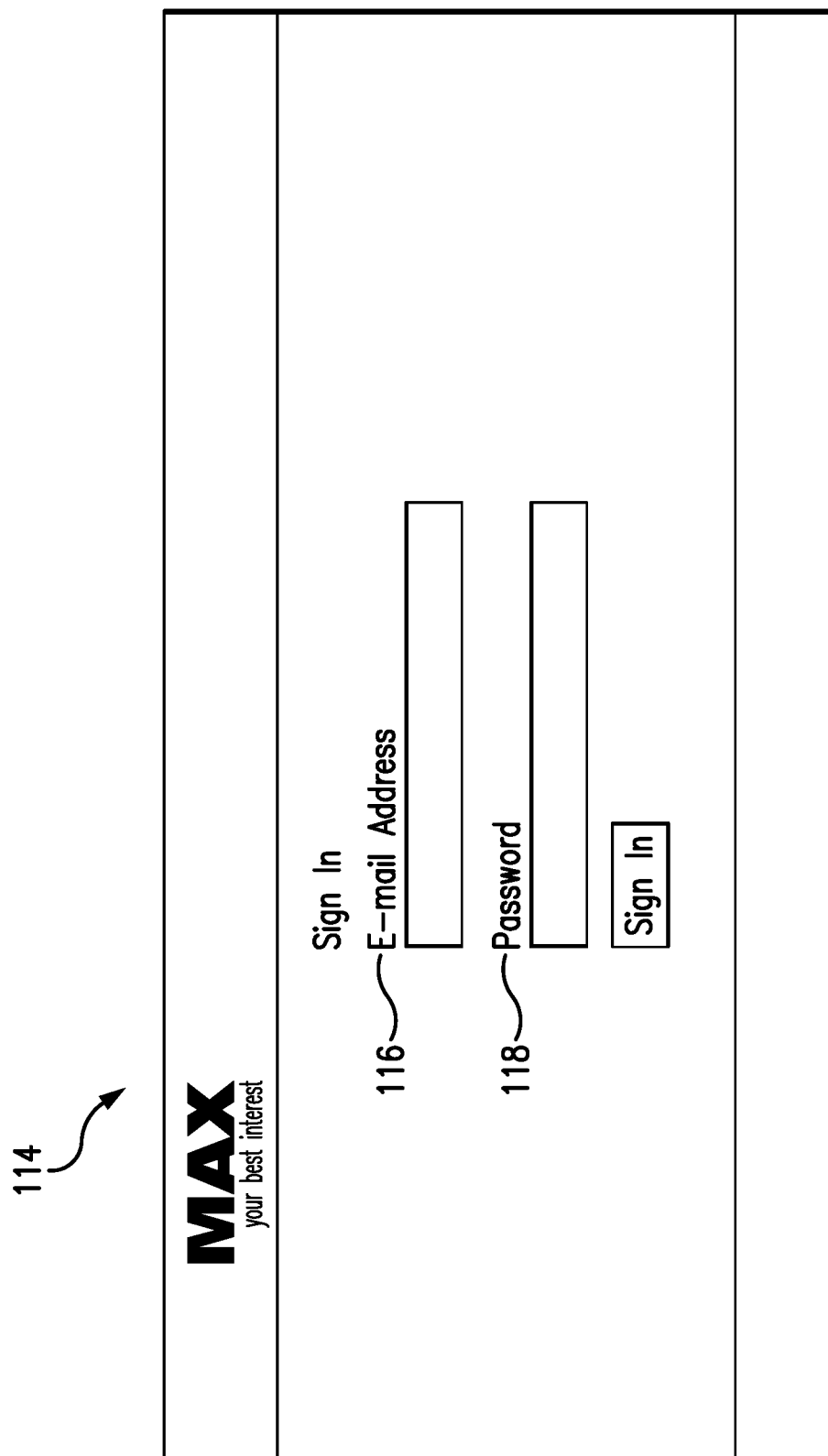
FIG. 4A is a schematic view of an exemplary embodiment of the image layer of the client interface shown in FIG. 1.

Referring additionally to FIG. 4A, product program 110 includes a visual layer 114 that is transmitted through data network 1100 to at least client interface 200. Visual layer 114 may be, for example, an application layer or website configured to be displayed on display 210 of client interface 200. In this manner, display 210 of client interface 200 and visual layer 114 of product program 110 are together configured to communicate to display data input and/or output by product program 110 in a manner accessible to the user as described above.

Accordingly, visual layer 114 may include one or more indicia 116 that may include for example, letters, numbers, colors, patterns, and/or symbols, to name a few. Visual layer 114 may also include one or more input fields 18 in which a user may input data through control device 220, for example, letters, numbers, symbols, and/or markings such as radio buttons, check boxes, or text boxes. Data supplied from input fields 118 are transmitted to product program 110 through data network 1100.

Credential data store 120 and rule data store 130 are repositories of data connected to product program 110 along data network 1100. Either or both of credential data store 120 and rule data store 130 may be configured as a database, for example, a relational database or key-value data storage system. Credential data store 120 and/or rule data store 130 may be supported on one or more network-based environments that may comprise one or more virtual and/or physical servers, for example, a cloud computing environment. Credential data store 120 and rule data store 130 may be supported on a common cloud computing environment or separate cloud computing environments. In embodiments, data associated with financial management system 1000 may be stored on a single data store, two data stores as shown, or, in embodiments, any number of data stores. In embodiments, data associated with financial management system 1000 may be stored on multiple data stores, for example, for security purposes so that data is compartmentalized to inhibit unauthorized access. In embodiments, data may be transmitted to data stores 120, 130 by a user through client interface 200 or by another path through product program 110, for example, data input by a user or system administrator or via an API.

Credential data store 120 may include data associated with information capable of accessing any of checking account 300, savings accounts 400a, 400b, 400c. For example, credentials such as account numbers, routing numbers, challenge questions that may be posed by an account interface and associated answers, login names, passwords, PIN codes, e-mail addresses, contact telephone numbers, digital certificates, and/or web cookies, to name a few of the credentials that may need to be provided to gain access to a user's checking and/or savings accounts.

Accordingly, data stored on credential data store 120 may comprise confidential information, for example, information deemed secure by a user so that only the user and/or user-approved individuals and/or entities that are intended to be privy to such information may be granted access. In embodiments, one or more electronic security measures 122 may be incorporated into the architecture of credential data store 120 and/or product program 110, and/or may be disposed upstream of credential data store 120 along data network 1100 to inhibit unauthorized access to information associated with data stored on credential data store 120.

Rule data store 130 may include data that determines the configuration, scheduling, and/or sequence of operations of financial management network 100 with respect to accounts 300, 400a, 400b, and 400c. In this manner, rule data store 130 may store data associated with information supplied by a user through client interface 200 in the form of, for example, rules, boundary conditions, schedules, limits, tasks, commands, applications, and/or action identifications, to name a few.

Data associated with information relating to boundary conditions described above with respect to one or more accounts 300, 400a, 400b, 400c may include, for example: i) a minimum account balance; ii) a maximum limit of financial assets in a financial account; iii) a maximum and/or minimum transfer limit of financial assets to be transferred in a given financial transfer or within a specific period of time; iv) a maximum number of financial transfers that may be performed over a given period; v) a minimum difference in interest rates required before initiating a transfer of financial assets between financial accounts; and/or vii) a minimum difference in financial assets required to initiate a transfer of financial assets between financial accounts, to name a few. All such boundary conditions may be set by a user, a user's financial advisor, a financial institution, governmental or other body or by product program 110.

Data associated with information relating to a sequence of operations of financial management network 100 may include, for example, a length of time associated with initiating and/or restricting one or more actions of product program 110, for example, the cessation of further transfer of financial assets between savings accounts 400a, 400b, 400c and checking account 300, identifying the value of interest rates $i_1$, $i_2$, $i_3$, and/or, from information sources associated with, or independent from, third-party financial institutions, and/or providing data to a user through client interface 200, for example, information relating to checking account 300 and/or savings accounts 400a, 400b, 400c and/or prompting a user to input data through client interface 200.

In this manner, program product 110 is configured to take one or more actions and/or restrict one or more actions on at least savings accounts 400a, 400b, 400c based at least in part upon data received from rule data store 130. Such one or more actions may include the transfer of financial assets from one or more savings accounts 400a, 400b, 400c to checking account 300 and/or the transfer of financial assets to one or more of savings accounts 400a, 400b, 400c from checking account 300.

In the exemplary embodiment shown, program product 110 instructs one or more of savings accounts 400a, 400b, 400c to initiate a transfer of financial assets with respect to checking account 300. In this manner, program product 110 is configured to initiate the transfer of financial assets between savings accounts 400a, 400b, 400c and checking account 300 solely by initiating crediting and debiting actions on checking account 300 from the perspective of the savings accounts 400a, 400b, 400c so that no financial transfers are required to be initiated from checking account 300. Financial transfers may be implemented via the Automated Clearing House (ACH) network, or another method of electronic funds transfer known by those skilled in the art of the present disclosure.

In this regard, financial management network 100 may be configured such that program product 110 may initiate and/or restrict one or more actions on one or more of savings accounts 400a, 400b, 400c based on data stored in rule data store 130. In this manner, a set of rules may be stored in rule data store 130 in advance of a financial transfer so that the financial management network is at least partially automated to implement financial transfers based on the rules in rule data store 130. In this manner, financial management network 100 is configured such that a user is not required to continuously monitor and/or implement financial transfers among accounts 300, 400a, 400b, 400c. Such an automated configuration allows financial management network 100 to provide instructions for the implementation of a greater number of financial transfers without direct user input than might be practical for a user to perform directly, and with greater discipline. Accordingly, financial management network 100 affords a user the benefit of an increased and/or finer control of the distribution of financial assets across accounts 300, 400a, 400b, 400c, for example, to optimize the amount of interest earned on the financial assets in accounts 300, 400a, 400b, 400c without requiring additional time or effort by the user, and/or to ensure that financial assets are distributed across accounts 300, 400a, 400b, 400c to in a manner to be maximally covered by one or more insurance programs such as FDIC. Additionally or alternatively, financial management network 100 may afford a user such control to allocate the financial assets in accounts, 300, 400a, 400b, 400c in an optimized manner to take advantage of other beneficial factors, for example, available insurance coverage and/or maintaining a checking account at target balance.

It will be understood that, in embodiments, a financial management system may include a first financial account having a first interest rate and one or more additional financial accounts having respective interest rates that are greater than the first interest rate. A financial management network may be associated with such financial management systems so that financial assets may be transferred between the first financial account and any or each of the other financial account(s) in any combination or separation as described above.

Figure 5:
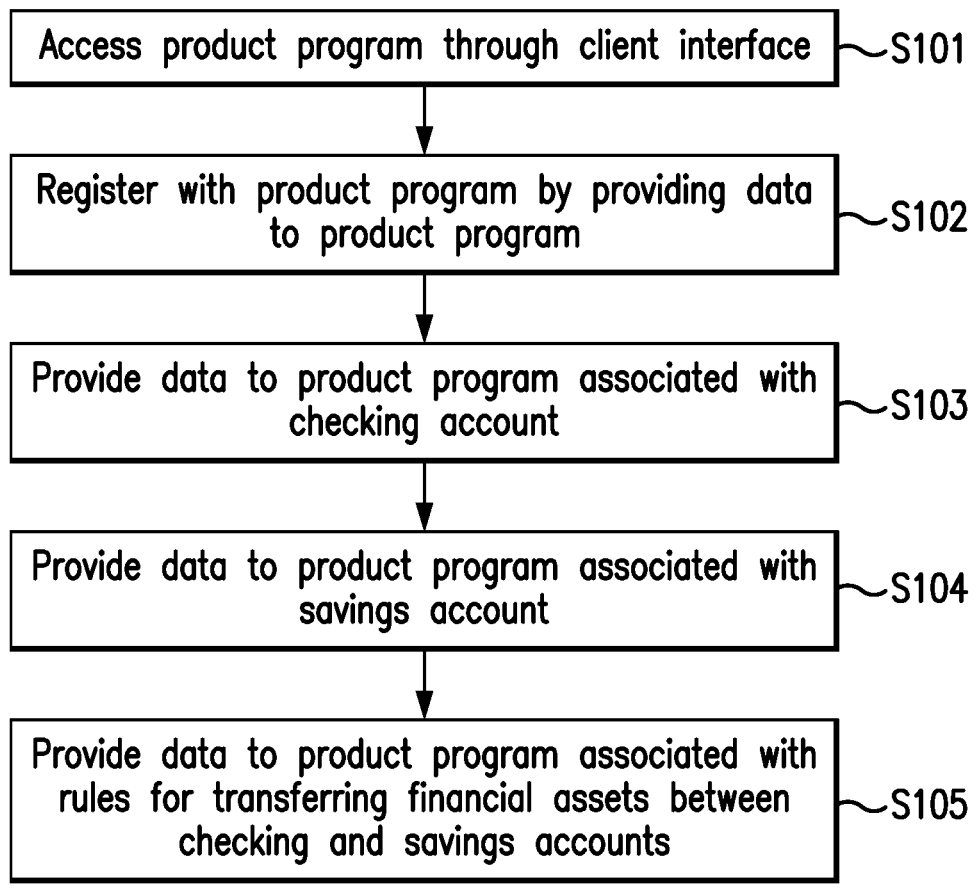
FIG. 5 is a process diagram of steps a user may take to configure the financial management system of FIG. 1 for use, according to an exemplary embodiment of the present disclosure.

Referring additionally to FIG. 5, a process diagram of steps a user engages in to configure financial management system 1000 for use is illustrated in accordance with an exemplary embodiment of the present disclosure.

With additional reference to FIG. 4A, in a first step S101, a user accesses the product program 110 through client interface 200 so that an image layer 114 of the product program can appear on display 210 to relay data to the user. A user may access product program 110, for example, by entering a website URL into an internet browser, selecting a shortcut to such website URL via an icon on a smartphone, tablet computer, wearable computer or similar device, or initiating a software application.

In a second step S102, a user registers an account with product program 110 by providing data to product program 110 through client interface 200 over data network 1100. In embodiments, a user may provide data to product program 110 that is associated with information such as, for example, an e-mail address, telephone number, username, password, and/or biographical information such as name, address, and/or date of birth, to name a few, as well as personal demographic information such as age, occupation, income, approximate balance of financial assets, to name a few. The data provided by the user in step S202 is received by the product program 110 and transmitted to credential data store 120 over data network 1100 so that a user thereafter may re-submit such data, or a portion thereof, through client interface 200 to access additional features of the product program 110. In embodiments, client interface 200 may store such data, for example, in a web browser or local storage medium, so that this data can be transferred from its stored location to product program 110 upon command by a user. In embodiments, this data may be stored on a different data store.

In embodiments, second step S102 or another step in the configuration of financial management system 1000 may include a user providing data to product program 110 through client interface 200 associated with information needed to setup an account at more than one financial institution and/or more than one account at a single financial institution. In this manner, financial management system 1000 may be configured to facilitate a user in registering, for example, for multiple financial accounts through a single, common application and/or substantially simplified registration process as compared to individual registration processes associated with different financial institutions and/or financial accounts.

Figure 4B:
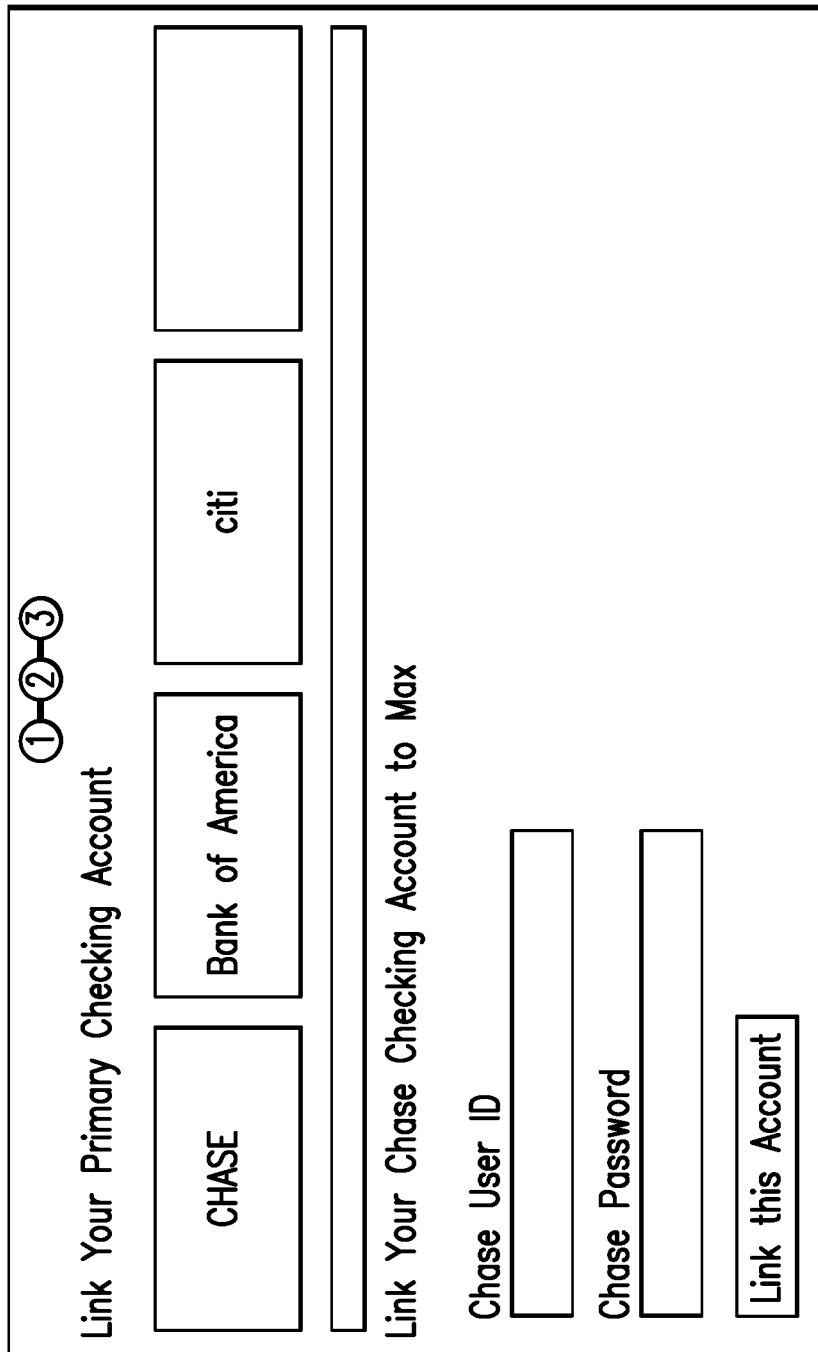
FIG. 4B is a schematic view of another exemplary embodiment of the image layer of the client interface shown in FIG. 1.

With additional reference to FIG. 4B, in a third step S103, data is provided to product program 110 that is associated with information related to checking account 300. Such information may include, for example, login name and password, account numbers, routing numbers, names, addresses, third party financial institution information, PIN numbers, answers to challenge questions, a contact telephone number or email address, and/or other identification and/or access information, as well as the client's desired target checking account balance. The data provided in step S203 may be stored in credential data store 120 and/or rule data store 130 in any combination or separation. In embodiments, such data may be associated with, for example, public information on the third party financial institution associated with checking account 300 and/or a history of one or more transactions or statuses of checking account 300. In embodiments, such data may be associated with information relating to, for example, account numbers, routing numbers, PIN numbers, and/or other access information associated with checking account 300.

With additional reference to FIG. 4C, in a fourth step S104, data is provided to product program 110 that is associated with information related to savings accounts 400a, 400b, 400c. Such information may be substantially similar to the types of information provided in step S103 with regard to checking account 300, and may accordingly be stored in credential data store 120 and/or rule data store 130 in any combination or separation as described above in step S104. In embodiments, a user may supply information related to any of accounts 300, 400a, 400b, 400c described over the course of a single connection session with product program 110, or over any number of sessions. It will be understood that a process for configuring a financial management system for use will include any number of additional steps relating to the input of data relating to identification and/or access information of a financial account in accordance with the number of financial accounts associated with the financial management system.

In a fifth step S105, data is provided to product program 110 that is associated with information related to a rules for transferring assets between checking account 300 and one or more of savings accounts 400a, 400b, 400c. Such rules may include, for example: i) a minimum or target account balance set by a user, financial institution, or other body; ii) a minimum or maximum limit of financial assets in a financial account set by a user, product program 110, a financial institution, or other body; iii) a maximum and/or minimum transfer limit of financial assets to be transferred in a given financial transfer or within a specific period of time as set by a user, financial institution, or governmental or other body; iv) a maximum number of financial transfers that may be performed over a given period as set by a user, financial institution, or governmental or other body; v) a minimum difference in interest rates required before initiating a transfer of financial assets between financial accounts as set by a user or by product program 110; and/or vii) a minimum difference in financial assets required before initiating a transfer of financial assets between financial accounts as set by a user or product program 110, to name a few.

It will be understood that the data supplied to product program 110 may in whole or in part be supplied by a source other than a user, for example, a financial advisor or system administrator or by one or more default settings of product program 110. It will be understood that the steps described above to configure financial management system 1000 may be completed in any order, combination, or separation as described above. In embodiments, such a process may include additional and/or alternative steps.

Figure 6A:
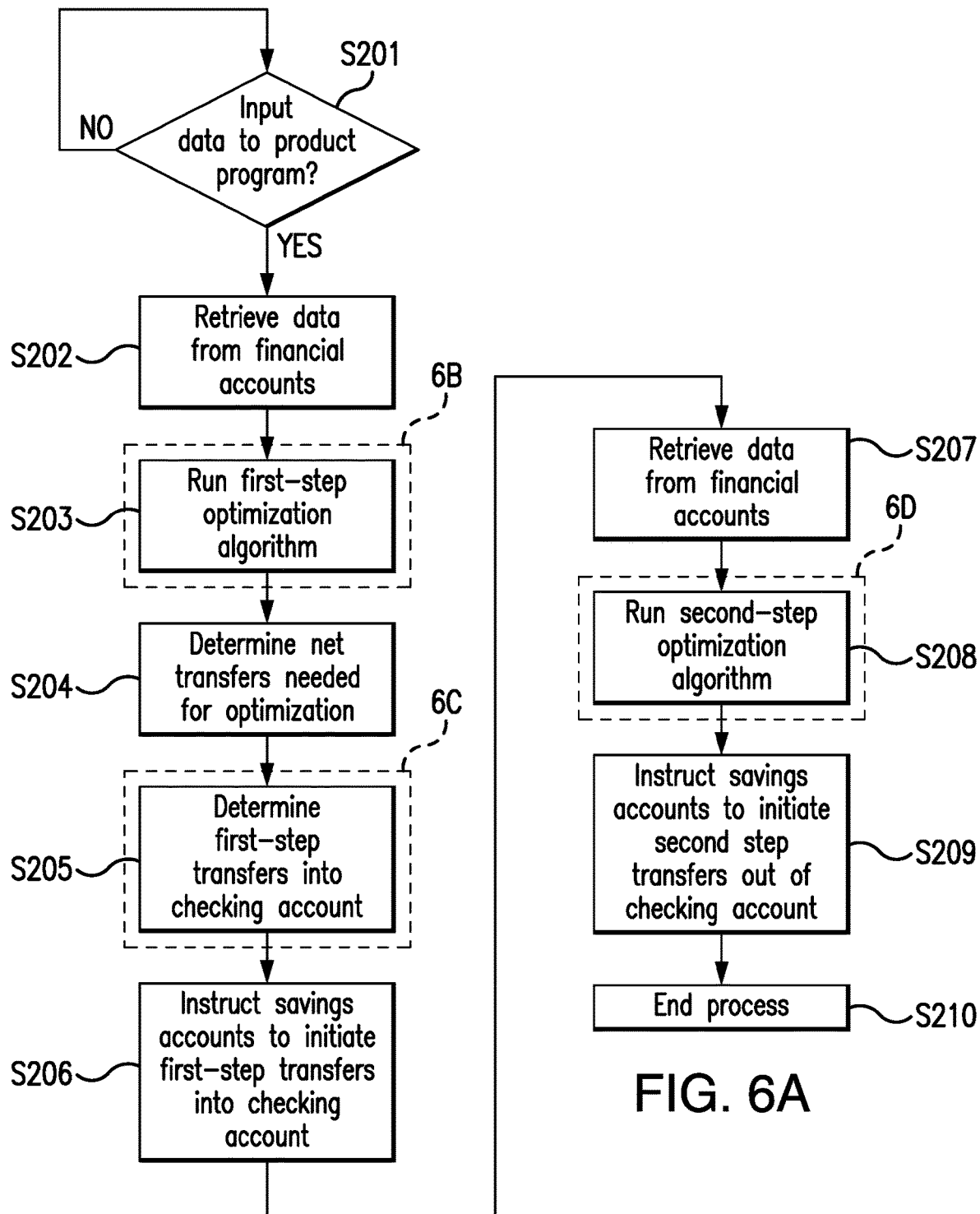
FIG. 6A is an operational flow chart of the financial management system of FIG. 1 according to an exemplary embodiment of the present disclosure.

Turning to FIG. 6A, and still referring to FIG. 1, an operational flow chart of a process of financial management system 1000 is illustrated in accordance with an exemplary embodiment of the present disclosure. It will be understood that this operational flow chart may be applicable to financial management system 1000 or any other financial management system based on the inventive concepts disclosed herein.

In a first step S201, input data is provided to product program 110 to initiate an optimization process which will culminate in the transfer of financial assets between one or more of savings accounts 400a, 400b, and 400c and checking account 300. Input data may be provided substantially in real-time, for example, by a user or system administrator, and/or may be stored data in rule data store 130 to be input under certain conditions, such as a scheduled task. For example, a first instance of the optimization process described herein may be initiated by a user through client device 200, and one or more successive instances of the optimization process may be initiated by product program 110 as a scheduled task. If no data instructing product program 110 to initiate a transfer is supplied to product program 110, first step S201 may be repeated. In embodiments, a timer and/or true/false condition switch may be disposed between successive iterations of first step S201 so that step S201 can only repeat following a set interval of time and/or a predetermined condition is met. A successive iteration of first step S201 may also be initiated by a user or system administrator on an ad hoc basis. For example, a client or his/her financial advisor may access the financial management network 100 to manually initiate an optimization in between scheduled optimizations.

If an optimization process is to be initiated, product program 110 retrieves data relating to one or more of accounts 300, 400*a*, 400*b*, and/or 400*c* in a second step S202. Data relating to one or more of accounts 300, 400*a*, 400*b*, and/or 400*c* may be transferred over data network 1100 directly from a third party financial institution, and/or or may be supplied by another source such as an independent reporting service or by the system administrator or via an API (application program interface). Data relating to one or more of accounts 300, 400*a*, 400*b*, and/or 400*c* may be associated with information such as, for example, a corresponding interest rate $i_1$, $i_2$, $i_3$, $i_4$, and/or one or more account balances.

In a third step S203, processor 112 of product program 110 applies one or more rules from rule data store 130 to the data obtained from the one or more of accounts 300, 400*a*, 400*b*, and/or 400*c* in step S202 to determine the optimal allocation of financial assets across financial accounts 300, 400*a*, 400*b*, 400*c* in a first-step optimization algorithm, as described further herein. Accordingly, step S203 yields a set of data relating to an allocation of financial assets that may be different from the allocation of financial assets retrieved from step S202.

In a fourth step S204, product program 110 determines the net amount of transfers of financial assets across accounts 300, 400*a*, 400*b*, 400*c* in order to arrive at the optimized allocation of financial assets determined in step S203. As described above, in embodiments, financial management system 1000 is configured to instruct transfers of financial assets in two steps: a first set of one or more transfers of financial assets from any one or more of savings accounts 400*a*, 400*b*, 400*c*; and a second set of one or more transfers of financial assets into any one or more of savings accounts 400*a*, 400*b*, 400*c* from checking account 300.

Accordingly, in a fifth step S205, product program 110 determines the optimum set of transfers of financial assets to be initiated from one or more of savings accounts 400*a*, 400*b*, 400*c*, into checking account 300 as described further herein.

In a sixth step S206, one or more of savings accounts 400*a*, 400*b*, 400*c* are instructed to initiate a transfer of financial assets into checking account 300 in amounts determined in step S205. In embodiments, step S206 may include transfers from one or more of savings accounts 400*a*, 400*b*, 400*c*. In embodiments, step S206 may involve no transfers of financial assets from any of savings accounts 400*a*, 400*b*, 400*c*, as described further herein.

In embodiments, instructions provided to savings accounts 400*a*, 400*b*, 400*c* may require the product program 110 to retrieve credentials from credential data store 120 to first access savings accounts 400*a*, 400*b*, 400*c*. In embodiments, checking account 300 may also be accessed in a similar manner. In embodiments, one or more of accounts 300, 400*a*, 400*b*, 400*c* may involve more than one level or layer of credential input on the part of product program 110, e.g., to satisfy multi-level or multi-factor authentication protocols.

For example, some financial institutions and banks will recognize a login from an unauthorized client computer and prompt the user/account holder to provide further authentication in addition to the account holder's username and password before allowing access to the account holder's account. Such multi-factor authentication protocols may involve a bank's website indicating that it will be transmitting a pre-determined or random authentication code to the user's cell phone by voice or text, or by email to the user's email address, which cell phone number and email address the user or system administrator has previously entered in his user data on the bank's website when the account was initially set up. The user must then retrieve the transmitted code from his landline phone or cell phone or from his email provider within a preset limited time period and correctly enter the code on the bank's website before being permitted to continue with the user login.

Comparably, a financial institution that manages one or more of accounts 300, 400*a*, 400*b*, 400*c* may detect access to an account by a new origination point along data network 1100, e.g. a point other than client device 200, and may require a response, answer, and/or code to be input in response to an inquiry before permitting connection of an account to the financial management network 100. Typically, such a response, answer, and/or code is provided by a user through client device 200 or another device connected to the relevant account.

However, in such a case, product program 110 may be configured to communicate directly with one or more of accounts 300, 400*a*, 400*b*, 400*c* as a proxy for the user, for example, to receive and/or interpret (directly or via a third-party software service provider) unique authentication codes, which may include alphanumeric characters and/or verbal responses and provide responses to questions or requested authentication codes which may include alphanumeric characters and/or verbal responses. Such communication between product program 110 and one or more of accounts 300, 400*a*, 400*b*, 400*c* may occur over one or more data and/or voice networks or services, for example, e-mail, mobile, satellite, or land-lined telephone, and/or SMS, to name a few. Accordingly, product program 110 (in certain embodiments, via a selected third-party vendor) may be authorized, e.g., designated as a point of contact, to communicate directly with one or more of accounts 300, 400*a* 400*b*, 400*c* on behalf of the account holder, without intervention by the account holder or user.

In particular, with respect to multi-factor authentication, the financial management network 100 implements unique and inventive concepts that permit it to act as proxy for the user and respond to any multi-factor authentication that may be required for account access in a way that does not require user intervention, while simultaneously maintaining rigid security measures to avoid unauthorized access to the user's accounts by other parties. For this purpose, and to the extent necessary, a limited power of attorney is provided by the user/account holder to the financial management network 100 to permit the administrators of the financial management network 100 to act as agent for the user/account holder.

As described herein, the one or more processors of the financial management network 100 perform multiple processes that permit an account holder to access account information across his various accounts and that permit the financial management network 100 to interface with banks holding the one or more user accounts, and in particular to permit the financial management network 100 to login as the user by using the user's credentials stored in credential data store 120. Once logged into a user's account, these processes can verify the accounts that are linked, fetch balances, instruct transfers, prepare transaction histories, retrieve 1099-INT tax forms or other client communications provided by the associated banks.

To reduce latencies and provide a high performance processing framework, the financial management network 100 may be configured to run multiple processes in parallel. For example, multiple processes may be executed to provide headless web browsers that are used to navigate to and interact with the websites of multiple banks at the same time, for example to fetch balances, send funds transfer instructions, retrieve year-end 1099-INT tax statements, and the like.

As noted above, processes may also be implemented by the financial management network 100 to handle multi-factor authentication required by some banks and financial institutions before permitting account access, without user intervention. To enable the financial management network 100 to directly respond to a multi-factor authentication request within the user present, the following procedure is implemented.

When a user first links an account to the financial management network 100, the user supplies their username and password to the financial management network 100, and a process within the financial management network 100 controls a web browser and uses the user's credentials to attempt to log in to the bank's website holding the account.

If the bank responds to the log in attempt by issuing challenge questions or by requiring additional multi-factor authentication such as entry of a code sent to the user, then the financial management network 100 will prompt the user for the additional information that the bank website has requested.

For example, after a user links an American Express savings account to the financial management network 100 for the first time, the financial management network 100 will attempt to log in to the American Express savings account using the provided username and password.

If the web page indicates that additional multi-factor authentication is required, for example, input of a code that is sent to the user's cell phone or email address, then a process running within the product program 110 will present to the user the list of email addresses and/or phone numbers that is stored on the American Express site to which the authentication code can be sent, and will prompt the user to select one of the listed addresses or phone numbers. The process then passes the selected option to the American Express site so that the site sends the code using the selected option. Once received by the user at his selected address or phone number, the user enters the code into the financial management network 100, which then forwards the code to the American Express site to respond to the multi-factor authentication request and gain access to the site. Once the product program 110 has access to the American Express site, it adds to the user data stored by the site an additional multi-factor authentication endpoint, e.g., an additional phone number or email address, that is accessible either directly by the product program 110 or, in some cases, via a third-party software service provider, and to which subsequent authentication codes may be sent.

Upon subsequent log ins by the product program 110 to the American Express site when the user is not present, the product program 110 can select the additional multi-factor authentication endpoint that has been entered in accordance with the foregoing description, e.g., a phone number known to the product program 110, which the product program 110 (or third-party software service provider) can then monitor for the transmitted code. Accordingly, once the additional multi-factor authentication endpoint has been added, the product program 110 can respond directly to multi-factor authentication requests without requiring user intervention or user presence, and gain access to the user's account to perform various transactions, as discussed herein, to optimize the user's financial assets among the linked accounts.

To enhance security, the credential data store 120 is formed as an encrypted key/value database to protect the users' sensitive data which may include email addresses, user names, passwords, account numbers, PIN numbers, security questions and answers, and the like.

In some embodiments, data is encrypted before it is passed to the credential data store 120, and the data is further encrypted in credential data store 120 before being stored.

To further enhance security and protect against unauthorized acts that may compromise critical operations, the financial management system 100 may, through product program 110 or through other means, implement a two-man rule algorithm, for example as may be implemented using Shamir's Secret Sharing algorithm, to require that any such critical operations be authorized by at least two persons having appropriate authority.

Reverting back to FIG. 6A, in a seventh step S207, product program 110 retrieves data relating to one or more of accounts 300, 400a, 400b, and/or 400c. Data relating to one or more of accounts 300, 400a, 400b, and/or 400c may be transferred over data network 1100 directly from a third party financial institution, and/or may be supplied by another source such as an independent reporting service, or by the system administrator. Data relating to one or more of accounts 300, 400a, 400b, and/or 400c may be associated with information such as, for example, an interest rate $i_1$, $i_2$, $i_3$, $i_4$, and/or one or more account balances. Accordingly, step S207 is substantially similar to step S202 described above.

Step S207 is performed again after the transfers of financial assets in step S206 because one or more conditions of any of accounts 300, 400a, 400b, 400c may have changed following step S206. In particular, the transfers of financial assets initiated in step S206 may take a period of time to be processed, for example, one or more days, so that intervening conditions may have occurred, for example, a change in one or more of interest rates $i_1$, $i_2$, $i_3$, a change in the amount of financial assets in an account such as checking account 300 due to, for example, a deposit or withdrawal, or another change in a condition affecting one or more of accounts, 300, 400a, 400b, 400c, for example, a change in the FDIC insurance limit or other user-set constraints such as maximum, minimum or target account balances.

In an eighth step S208, a second-step optimization algorithm is applied to the information gathered in step S207 to ensure that the transfers of financial assets into savings accounts 400a, 400b, 400c originally determined in step S204 will satisfy the rules in rule data store 130. Accordingly, the second step optimization algorithm applied in step S208 is similar to the first-step optimization algorithm applied in step S203, but relates to optimizing the second-step transfers into one or more of savings accounts, 400a, 400b, 400c originally determined in step S203.

If no conditions affecting one or more of accounts, 300, 400a, 400b, 400c have occurred since the first-step financial transfers were initiated in step S206, the second-step financial transfers may proceed as originally determined in step S204. However, if one or more conditions affecting one or more of accounts, 300, 400a, 400b, 400c have occurred in the interim, the second-step optimization algorithm may adjust the second-step financial transfers to compensate for these changed conditions according to the rules in rule data store 130. In this manner, steps S207 and S208 together serve as a verification and/or adjustment of the second-step financial transfers originally determined in step S204.

In a ninth step S209, one or more of savings accounts 400a, 400b, 400c are instructed to initiate a transfer of financial assets out from checking account 300 in amounts determined in step S208. In embodiments, step S209 may include transfers into one or more of savings accounts 400a, 400b, 400c from checking account 300. In embodiments, step S209 may involve no transfers of financial assets into any of savings accounts 400a, 400b, 400c from checking account 300, for example, due to a lack of available financial assets that may be determined in step S208 due to a changed condition of one or more of accounts 300, 400a, 400b, 400c between steps S206 and S207 or due to changes in interest rates or other user-set constraints.

In a tenth step S210, the process may terminate following the last instructed financial transfer in step S209 and confirmation that the recipient accounts have received their intended transfers. For example, the financial management network 100 may periodically (e.g., daily) check the account balances and account activity in the recipient accounts to confirm that the intended transfers have been completed. In embodiments, a timer and/or true/false condition switch may be disposed between successive iterations of step S210 and step S201 so that step S201 can only repeat following a set interval of time and/or a predetermined condition is met after step S210 is complete. In embodiments, a user or system administrator may manually trigger another optimization before such interval or predetermined condition is met.

Figures 1, 6B:
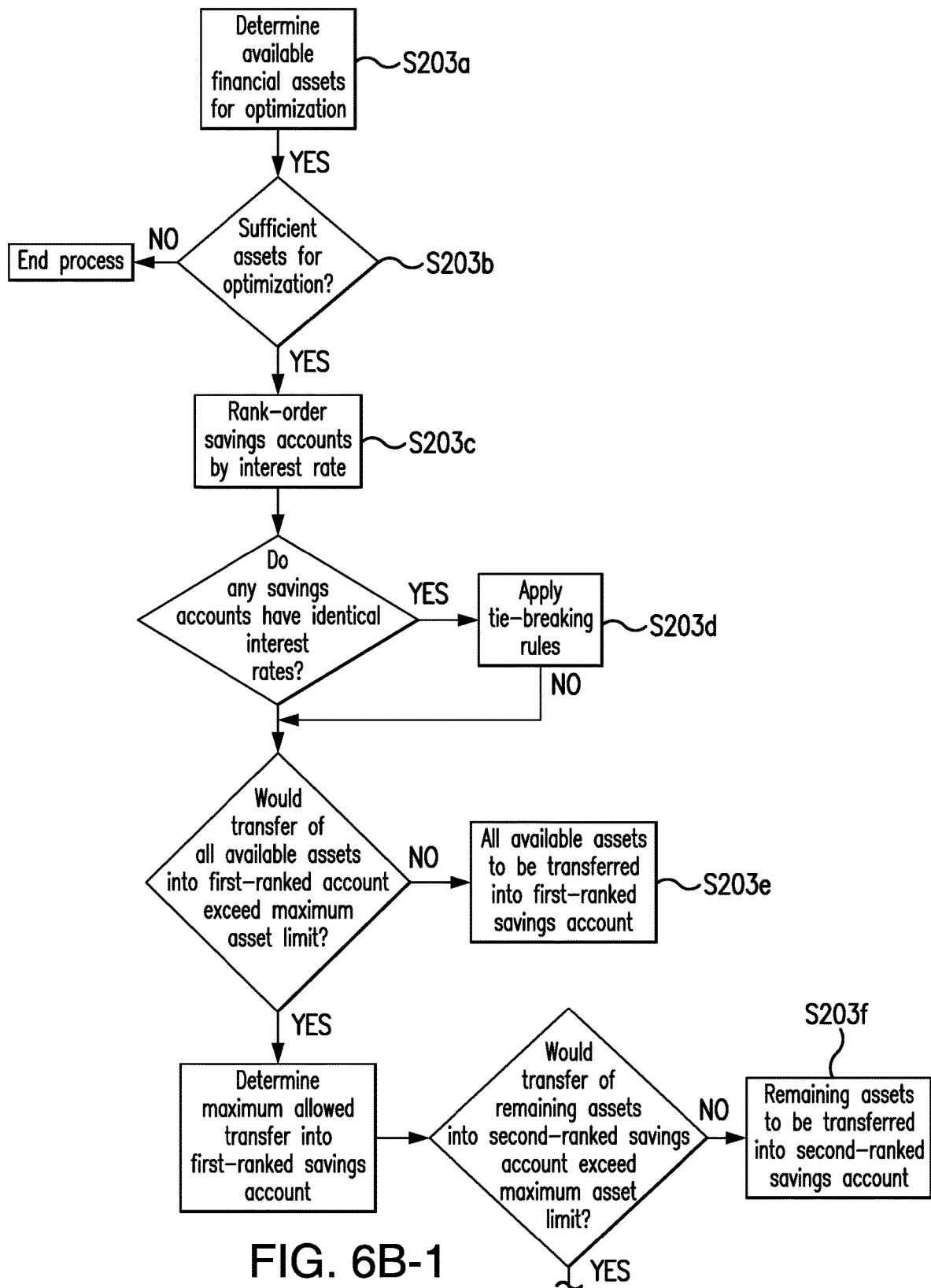
Figures 2, 6B:
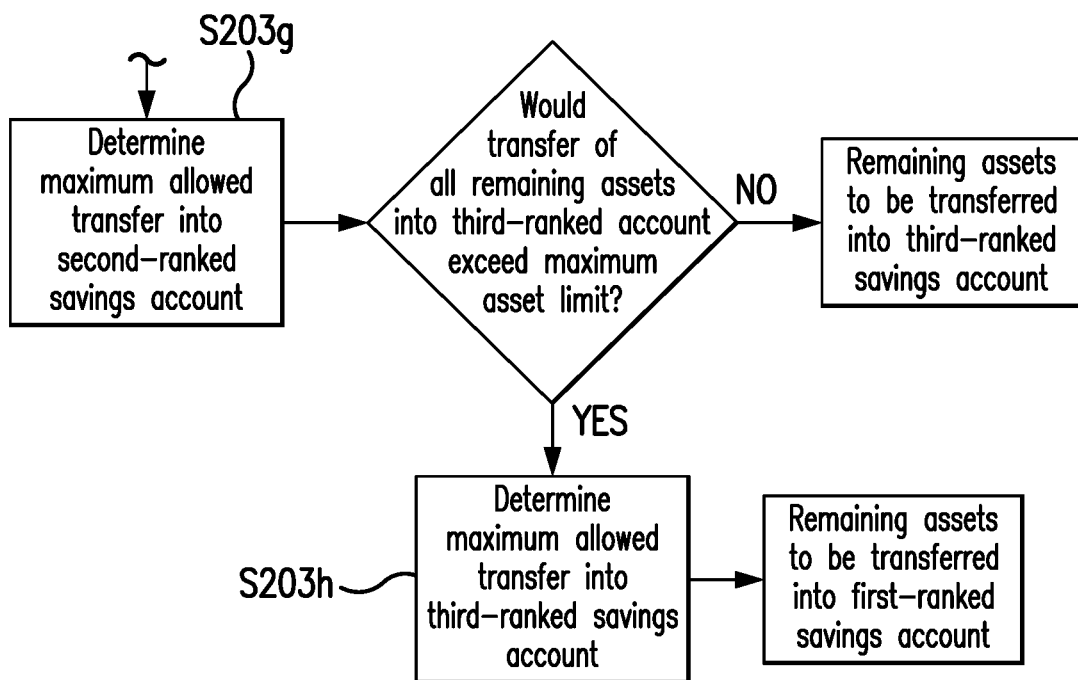

Turning to FIG. 6B, the first-step optimization algorithm shown in step S203 of FIG. 6A will be described in detail according to an exemplary embodiment of the present disclosure.

In a first step S203a of the first-step optimization algorithm, the product program 110 determines the available financial assets for optimization by deducting from the sum of the account balances in step S202 (FIG. 6A) the minimum account balances for each of accounts 300, 400a, 400b, 400c according to the rules stored in rule data store 130. Accordingly, in step S203a, product program 110 determines the remaining financial assets in all of accounts 300, 400a, 400b, 400c after the respective minimum account balances have been satisfied. In embodiments, minimum account balances may additionally or alternatively be input by a user through client device 200, a system administrator, or by a default setting of product program 110.

In a second step S203b, product program 110 determines whether sufficient financial assets are available for optimization. In embodiments, a positive, nonzero value determined in step S203a may be sufficient for optimization. In embodiments, sufficient financial assets for optimization may be determined by a rule in rule data store 130, for example, a minimum difference in financial assets between two given accounts for a transfer of financial assets to occur. If sufficient financial assets are unavailable for optimization, the process may be terminated.

If sufficient financial assets are available for optimization, product program 110 may proceed to rank order savings accounts 400a, 400b, 400c to determine the priority order in which available financial assets will be transferred for optimization in a third step S203c. Savings accounts 400a, 400b, 400c may be rank ordered by interest rate, descending from the highest interest rate. In embodiments, savings accounts 400a, 400b, 400c may be rank ordered by a different factor.

In a fourth step S203d, two or more of savings accounts 400a, 400b, 400c may have an identical value for a factor by which savings accounts 400a, 400b, 400c are rank ordered, for example, an identical interest rate. In such embodiments, financial management network 100 may utilize subjective and/or objective tiebreaker factors or rules stored in rule data store 130 to determine which of the one or more savings accounts offering the same interest rate should be given priority for a given financial transfer. Such factors may include, for example, objective or subjective customer service ratings, associated fees and/or account or transfer limits, and/or historical interest rates or rate volatility, to name a few.

In embodiments, savings accounts 400a, 400b, 400c may be rank-ordered by a different factor, or by a combination of factors that may or may include interest rates as described above. Such different factors may be subjective and/or objective, for example, so that one account may be rank-ordered lower than another account having a higher interest rate.

Once savings accounts 400a, 400b, 400c have been rank ordered, the first-step optimization algorithm determines if it is possible to transfer all the available financial assets for optimization determined in step S203a into the first rank-ordered savings account according to the rules in rule data store 130 in a fifth step S203e. In an exemplary embodiment, such rules may comprise a maximum account balance for a given account, for example, the FDIC insurance limit and/or a user-defined maximum account balance. In other embodiments, the rules applied from rule data store 130 may include, for example: for example: i) a maximum account balance; ii) a maximum limit of financial assets in a financial account, such as the maximum FDIC insurance limit; iii) a maximum and/or minimum transfer limit of financial assets to be transferred in a given financial transfer or within a specific period of time; iv) a maximum number of financial transfers that may be performed over a given period; v) a minimum difference in interest rates required before initiating a transfer of financial assets between financial accounts; and/or vii) a minimum difference in financial assets required to initiate a transfer of financial assets between financial accounts, to name a few, in any order, separation, and/or combination. All such rules may be set by a user, a user's financial advisor, a financial institution, or governmental or other body, or product program 110.

Accordingly, in step S203e, the first-step optimization algorithm determines whether the first-ranked savings account can receive all available financial assets for optimization under the rules in rule data store 130. If product program 110 determines that the first-ranked savings account can receive all available financial assets for optimization, the process proceeds to step S204 (FIG. 6A).

If the first-ranked savings account cannot by itself receive all available financial assets for optimization, the process proceeds to a sixth step S203f in which product program 110 determines the maximum amount of available financial assets for optimization that can be transferred into the first-ranked savings account, and any remaining available financial assets for optimization thereafter. Product program 110 then determines whether the second-ranked savings account can receive all available financial assets for optimization under the rules in rule data store 130. If product program 110 determines that the second-ranked savings account can receive all available financial assets for optimization, the process proceeds to step S204 (FIG. 6A).

If the second-ranked savings account cannot by itself receive all remaining available financial assets for optimization, the process proceeds to a seventh step S203g, in which product program 110 determines the maximum amount of available financial assets for optimization that can be transferred into the second-ranked savings account, and any remaining available financial assets for optimization thereafter. Product program 110 then determines whether the third-ranked savings account can receive all remaining available financial assets for optimization under the rules in rule data store 130. If product program 110 determines that the third-ranked savings account can receive all available financial assets for optimization, the process proceeds to step S204 (FIG. 6A).

In this manner, financial management system 1000 provides an optimization process with a "waterfall" configuration that first determines an available pool of financial assets for optimization, and proceeds to prepare to instruct a transfer of the maximum amount of financial assets allowed by a set of boundary conditions sequentially into accounts that are rank-ordered, for example, by interest rate. It will be understood that, in embodiments, steps 203e, 203f, 203g, may continue corresponding to the number of savings accounts included in a financial management system.

If the third-ranked savings account cannot by itself receive all remaining available financial assets for optimization, the process proceeds to an eighth step S203h, in which product program 110 determines the maximum amount of available financial assets for optimization that can be transferred into the third-ranked savings account, and that any remaining available financial assets for optimization thereafter will be transferred into the first-ranked savings account. In this manner, step S203h may override a maximum account limit applied in step S203e. In embodiments, product program 110 may be configured such that the available financial assets for optimization do not exceed the maximum allowable account balances of savings accounts 400a, 400b, 400c according to the rules in rule data store 130, such that any excess funds would be transferred to (or remain within) checking account 300. The process then proceeds to step S204 (FIG. 6A).

Figure 6C:
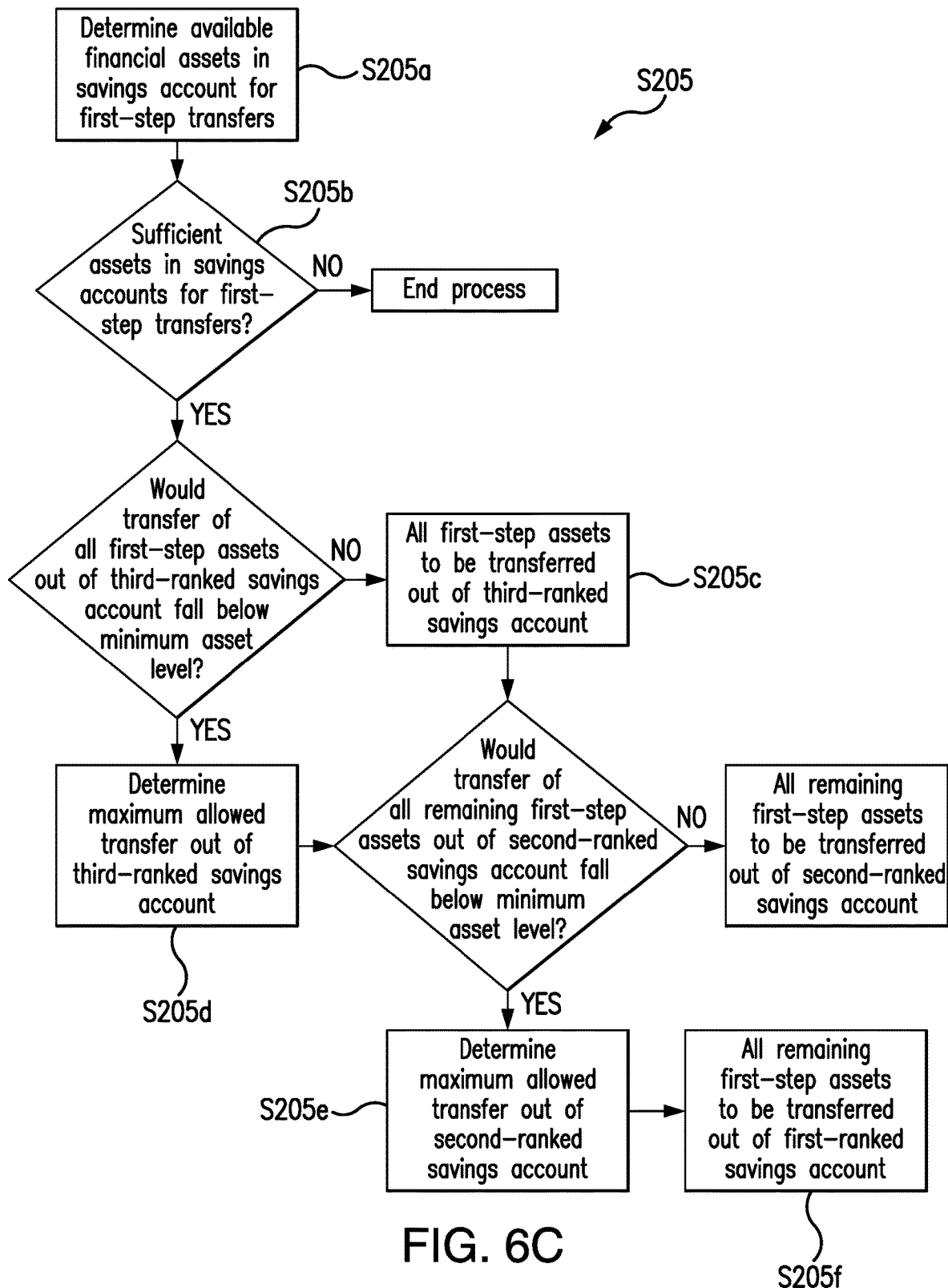
FIG. 6C is a flow chart of the area of detail identified in FIG. 6A as S205.

Turning to FIG. 6C, the first-step transfers of financial assets shown in step S205 of FIG. 6A will be described in detail according to an exemplary embodiment of the present disclosure.

Following the determination in step S204 (FIG. 6A) of the net amount of financial assets to be transferred into checking account 300 for the first step of optimization, product program 110 proceeds to determine the available amount of financial assets in savings accounts 400a, 400b, 400c for transfer into checking account 300 in a first step S205a. Product program 110 makes such a determination by deducting from the savings account balances retrieved in step S202 (FIG. 6A) the minimum account balances for each of accounts 400a, 400b, 400c according to the rules stored in rule data store 130. Accordingly, in step S203a, product program 110 determines the remaining financial assets in accounts 400a, 400b, 400c after the respective minimum account balances have been satisfied. In embodiments, minimum account balances may additionally or alternatively be input by a user through client device 200, a system administrator, or by a default setting of product program 110. If no financial assets are available for transfer in the first-step of optimization, the process may proceed directly to step S208 (FIG. 6A).

If sufficient financial assets are available for transfer into checking account 300 in the first-step of optimization, product program proceeds to determine the priority order in which available financial assets will be transferred out of savings accounts 400a, 400b, 400c. The priority order for the transfer of financial assets into checking account 300 may be the reverse of the rank order determined in step S203c (FIG. 6B) so that financial assets are first pulled from the lowest-ranked savings account. In embodiments, savings accounts 400a, 400b, 400c may be ordered by a different factor.

In a third step S205c, product program 110 proceeds to determine if it is possible to transfer all the available financial assets for the first-step of optimization from the third rank-ordered savings account according to the rules in rule data store 130 in a fifth step S203e. In an exemplary embodiment, such rules may comprise a minimum account balance for the third-rank ordered savings account, for example, a user-defined or financial institution-defined minimum account balance. In other embodiments, the rules applied from rule data store 130 may include, for example: for example: i) a minimum account balance; ii) a minimum limit of financial assets in a financial account, such as the maximum FDIC insurance limit; iii) a maximum and/or minimum transfer limit of financial assets to be transferred in a given financial transfer or within a specific period of time; iv) a maximum number of financial transfers that may be performed over a given period; v) a minimum difference in interest rates required before initiating a transfer of financial assets between financial accounts; and/or vii) a minimum difference in financial assets required to initiate a transfer of financial assets between financial accounts, to name a few, in any order, separation, and/or combination. All such rules may be set by a user, a user's financial advisor, a financial institution, or governmental or other body, or by product program 110.

Accordingly, in step S205c, the first-step optimization algorithm determines whether the third-ranked savings account can send all available financial assets required for transfer in the first step of optimization under the rules in rule data store 130. If product program 110 determines that the third-ranked savings account can send all available financial assets required for transfer in the first step of optimization, the process proceeds to step S206 (FIG. 6A).

If the third-ranked savings account cannot by itself send all available financial assets required for optimization by itself, the process proceeds to a fourth step S203d in which product program 110 determines the maximum amount of available financial assets that can be transferred out of the third-ranked savings account, and any remaining available financial assets for transfer into checking account 300 thereafter. Product program 110 then determines whether the second-ranked savings account can send all remaining financial assets required for transfer under the rules in rule data store 130. If product program 110 determines that the second-ranked savings account can send all available remaining financial assets for transfer, the process proceeds to step S206 (FIG. 6A).

If the second-ranked savings account cannot by itself send all remaining available financial assets required for optimization by itself, the process proceeds to a fifth step S203e, in which product program 110 determines the maximum amount of remaining financial assets for transfer that can be transferred from the second-ranked savings account, and any remaining available financial assets required for optimization thereafter.

In a sixth step, product program 110 then determines that the remaining financial assets for transfer will be transferred out of the first-ranked savings account. The process then proceeds to step S206 (FIG. 6A).

Figures 1, 6D:
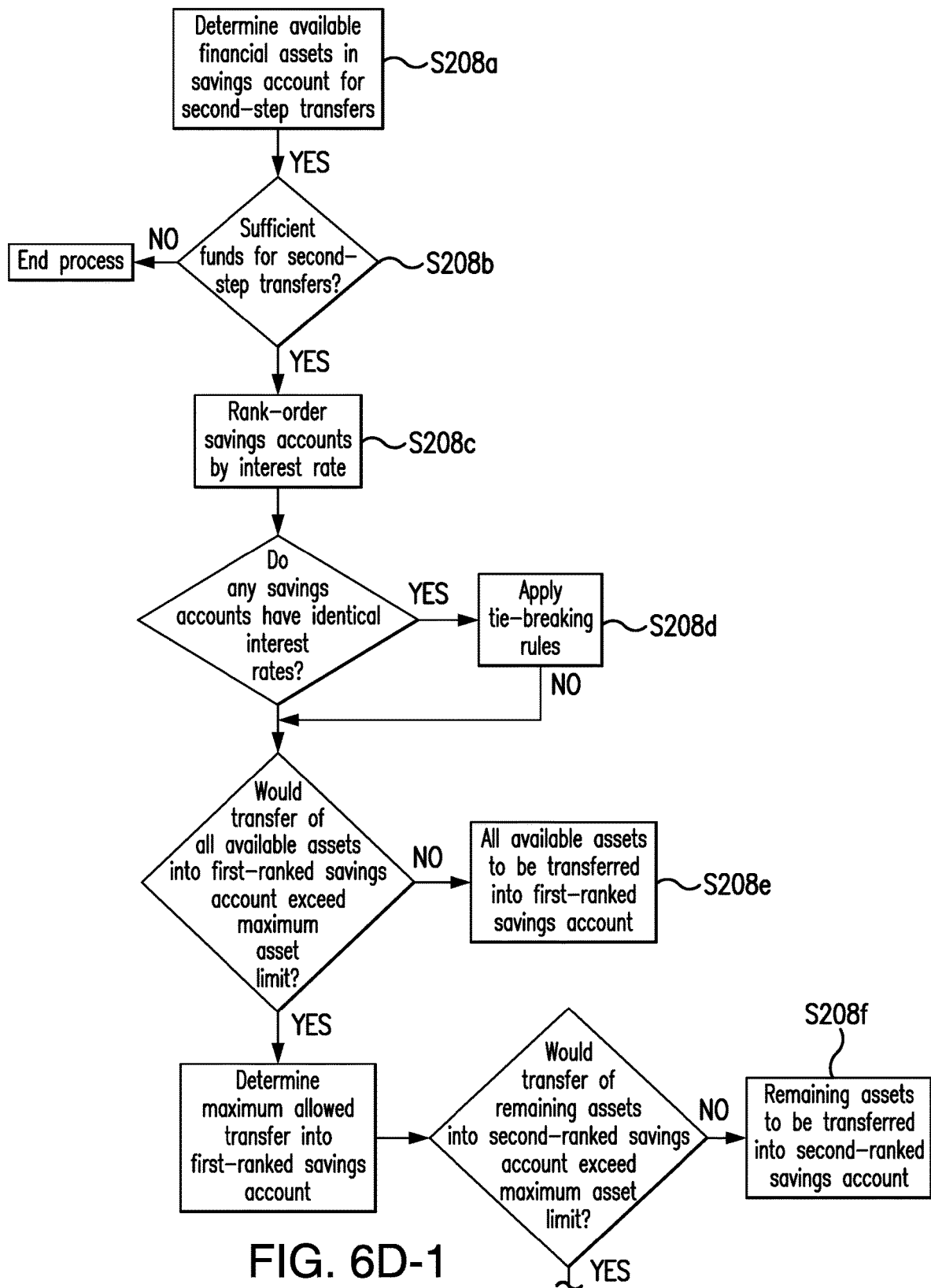
Figures 2, 6D:
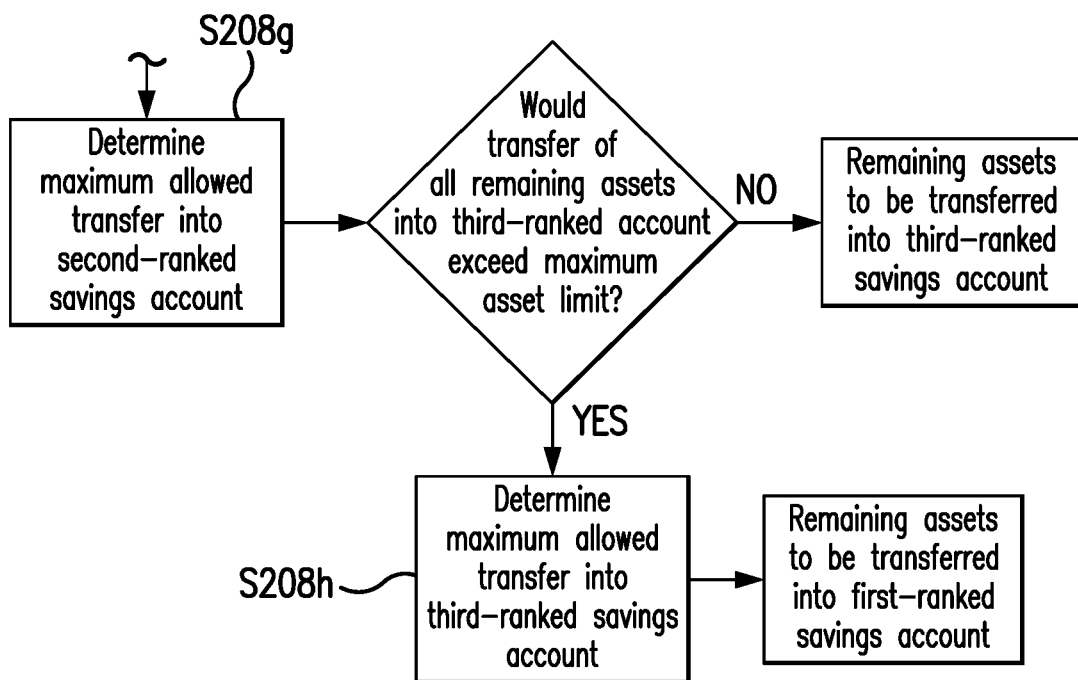

Turning to FIG. 6D, the second-step optimization algorithm shown in step S208 of FIG. 6A will be described in detail according to an exemplary embodiment of the present disclosure.

The second-step optimization algorithm begins in a similar manner to the first-step optimization algorithm described above, in that product program 110 determines the available amount of financial assets for transfer in the second-step of optimization (S208*a*); whether sufficient financial assets are available for the transfers in the second step of optimization (S208*b*); rank-orders the savings accounts 400*a*, 400*b*, 400*c* (S208*c*); and determines whether any tie-breaking rules need to be applied to complete the rank-ordering of savings accounts 400*a*, 400*b*, 400*c* (S208*d*). Accordingly, and as described above, the second-step optimization algorithm verifies the preliminary determination of financial assets to be transferred into one or more of savings accounts 400*a*, 400*b*, 400*c* from checking account 300 in step S204 because one or more conditions of any of accounts 300, 400*a*, 400*b*, 400*c*, or such other conditions described below, may have changed following step S206. In particular, the transfers of financial assets initiated in step S206 may take a period of time to be processed, for example, one or more days, so that intervening conditions may have occurred, for example, a change in one or more of interest rates $i_1$, $i_2$, $i_3$, a change in the amount of financial assets in an account such as checking account 300 due to, for example, a deposit or withdrawal, or another change in a condition affecting one or more of accounts, 300, 400*a*, 400*b*, 400*c*, for example, a change in the FDIC insurance limit or a change in user settings.

In the event that no intervening conditions have affected accounts 300, 400*a*, 400*b*, 400*c*, the second step transfers may proceed in the manner originally determined in step S204 (FIG. 6A). However, if one or more conditions of one or more of accounts 300, 400*a*, 400*b*, 400*c* have changed since the determination in step S204, product program 110 proceeds to adjust for such changes in the manner described below.

In a fifth step S208*e*, the second-step optimization algorithm determines if it is possible to transfer all the available financial assets for optimization determined in step S203*a* into the first rank-ordered savings account according to the rules in rule data store 130 in a fifth step S203*e*. In an exemplary embodiment, such rules may comprise a maximum account balance for a given account, for example, the FDIC insurance limit and/or a user-defined maximum account balance. In other embodiments, the rules applied from rule data store 130 may include, for example: for example: i) a maximum account balance; ii) a maximum limit of financial assets in a financial account, such as the maximum FDIC insurance limit; iii) a maximum and/or minimum transfer limit of financial assets to be transferred in a given financial transfer or within a specific period of time; iv) a maximum number of financial transfers that may be performed over a given period; v) a minimum difference in interest rates required before initiating a transfer of financial assets between financial accounts; and/or vii) a minimum difference in financial assets required to initiate a transfer of financial assets between financial accounts to name a few, in any order, separation, and/or combination. All such rules may be set by a user, a user's financial advisor, a financial institution, or governmental or other body, or by product program 110.

Accordingly, in step S208*e*, the first-step optimization algorithm determines whether the first-ranked savings account can receive all available financial assets for optimization under the rules in rule data store 130. If product program 110 determines that the first-ranked savings account can receive all available financial assets for optimization, the process proceeds to step S209 (FIG. 6A).

If the first-ranked savings account cannot by itself receive all available financial assets for optimization by itself, the process proceeds to a sixth step S208*f* in which product program 110 determines the maximum amount of available financial assets for optimization that can be transferred into the first-ranked savings account, and any remaining available financial assets for optimization thereafter. Product program 110 then determines whether the second-ranked savings account can receive all available financial assets for optimization under the rules in rule data store 130. If product program 110 determines that the second-ranked savings account can receive all available financial assets for optimization, the process proceeds to step S209 (FIG. 6A).

If the second-ranked savings account cannot by itself receive all remaining available financial assets for optimization by itself, the process proceeds to a seventh step S208*g*, in which product program 110 determines the maximum amount of available financial assets for optimization that can be transferred into the second-ranked savings account, and any remaining available financial assets for optimization thereafter. Product program 110 then determines whether the third-ranked savings account can receive all remaining available financial assets for optimization under the rules in rule data store 130. If product program 110 determines that the third-ranked savings account can receive all available financial assets for optimization, the process proceeds to step S209 (FIG. 6A).

If the third-ranked savings account cannot by itself receive all remaining available financial assets for optimization by itself, the process proceeds to an eighth step S208*h*, in which product program 110 determines the maximum amount of available financial assets for optimization that can be transferred into the third-ranked savings account, and that any remaining available financial assets for optimization thereafter will be transferred into the first-ranked savings account. In this manner, step S203*h* may override a maximum account limit applied in step S208*e*. In embodiments, product program 110 may be configured such that the available financial assets for optimization do not exceed the maximum allowable account balances of savings accounts 400*a*, 400*b*, 400*c* according to the rules in rule data store 130, such that any excess funds would remain in checking account 300. The process then proceeds to step S209 (FIG. 6A).

In the manner described above, the optimization algorithm of financial management network 1000 is configured to adjust for changing conditions that may affect one or more of accounts 300, 400*a*, 400*b*, 400*c*. Accordingly, if such an adjustment results in one or more instructed financial transfers to be constrained by one or more boundary conditions, for example, transfer limits, one or more optimization algorithms or processes may need to be run in order to fully optimize a user's financial assets across accounts 300, 400*a*, 400*b*, 400*c*. Such additional optimization algorithms may be run immediately, after a specific period of time has elapsed, or the system may wait until the next regularly-scheduled optimization.

In other embodiments, the instructions to transfer funds between accounts 300, 400a, 400b, and 400c may be repeated in the midst of the optimization to overcome boundary conditions (such as maximum daily transfer limits) rather than waiting until the end to re-run the entire optimization again. For example, if the financial management network 100 determines that a transfer of $500,000 is required, but the daily transfer limit is $250,000, the financial management network 100 may perform two transfers of $250,000 each in succession on the same or on subsequent days, as part of the first or second step transfer process, rather than repeat the entire optimization process just to effect the second transfer of $250,000.

Figure 4D:
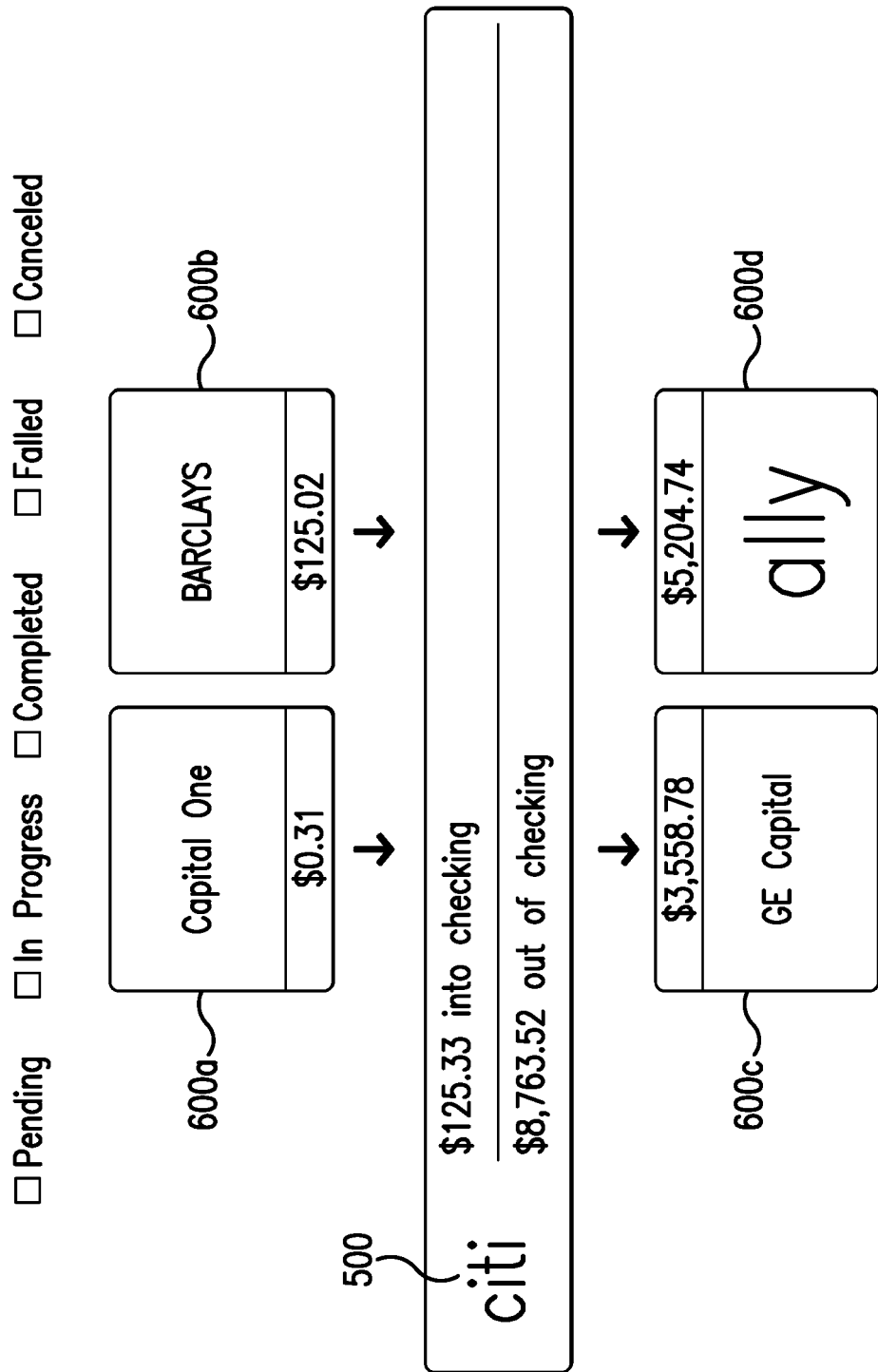
FIG. 4D is schematic view of another exemplary embodiment of the image layer of the client interface shown in FIG. 1.

Referring additionally to FIGS. 4C and 4D, an exemplary embodiment of the application of the optimization algorithm described above is illustrated as seen by a user on the image layer 114. In the exemplary embodiment shown, the optimization algorithm determines the optimized distribution of the user's assets by generating a rank order of one or more savings accounts according to relative interest rates. In embodiments, image layer 114 may be configured to display relative interest rates of savings accounts other than, or in addition to, savings accounts in which a user has financial assets.

As shown in the exemplary embodiment of FIG. 4C, account 1, account 2, account 3, account 4, and account 5 are listed in descending order according to their respective interest rates. However, as shown, account 1 and account 2 have an identical interest rate of 0.90%, and account 3 and account 4 have an identical interest rate of 0.85%. In such instances, financial management network 100 may utilize subjective and/or objective factors to determine which of the one or more savings accounts offering the same interest rate should be given priority for financial transfers. Such factors may include, for example, objective or subjective customer service ratings, associated fees and/or account or transfer limits, and/or historical interest rates or interest rate volatility, to name a few. Such factors may be input into rule data store 130, for example, by a system administrator. In the exemplary embodiment shown, account 1 is given priority over account 2 because account 1 does not impose a limit on account balances, whereas account 2 limits account balances to a maximum of $1,000,000. In this manner, the optimization algorithm is operable to distribute an amount of financial assets across two or more accounts so that the financial assets are deposited into a highest-ranked financial account that offers the combination of highest rates and least restrictive policies, and/or into a descending hierarchy of financial accounts subject, to rules applied by product program 110 as described above. In embodiments, the optimization algorithm or display/list of accounts may prioritize financial accounts according to a different factor.

Turning to FIG. 4D, another exemplary embodiment of a financial management system is illustrated, and includes a checking account 500 linked between a first, second, third, and fourth savings account 600a, 600b, 600c, 600d, respectively. Once the optimization algorithm has determined the optimized allocation of financial assets across available savings accounts, the product program 110 instructs savings accounts 600a, 600b, 600c, and/or 600d to initiate transfers of financial assets in one or more steps in series. In the exemplary embodiment shown, the optimization algorithm has determined that a total of $125.33 USD should be transferred into checking account 500 from savings accounts 600a and 600b, and a total of $8,763.52 USD should be transferred into savings accounts 600c and 600d from checking account 500. In this manner, the optimization algorithm has determined that financial assets in the amount of $8,763.52 USD should be transferred into savings accounts 600c and 600 d, for example, to take advantage of a higher interest rate associated with those savings accounts, and that a portion ($125.33 USD) of these financial assets should be removed from savings accounts 600a and 600b through checking account 500, for example, due to a lower interest rate associated with those savings accounts. The optimization algorithm has also determined the relative amounts of financial assets to be transferred from each of savings accounts 600a ($0.31) and 600b ($125.02 USD) for the transfer of $125.33 USD into checking account 500, and the relative amounts of financial assets to be transferred to each of savings accounts 600c ($3,558.78) and 600d ($5,204.74) in accordance with various boundary conditions determined by rules stored in rule data store 130 or otherwise provided through product program 110, for example: i) a minimum account balance; ii) a maximum limit of financial assets in a financial account; iii) a maximum and/or minimum transfer limit of financial assets to be transferred in a given financial transfer or within a specific period of time; iv) a maximum number of financial transfers that may be performed over a given period; v) a minimum difference in interest rates required before initiating a transfer of financial assets between financial accounts; and/or vii) a minimum difference in financial assets required to initiate a transfer of financial assets between financial accounts to name a few. All such rules may be set by a user, a user's financial advisor, a financial institution, or governmental or other body or by product program 110. The optimization algorithm has also determined that the net transfer of funds out of checking account 500 ought to be positive, reflecting the fact that the balance of financial assets in checking account 500 immediately prior to the initiation of the optimization exceeded a previously specified desired minimum or target balance for such checking account 500.

In accordance with the embodiments described above, the transfers occur in two separate steps: in a first step, an amount of $0.31 USD is instructed to be transferred from savings account 600a to checking account 500 in parallel with a transfer of $125.02 USD from savings account 600b to the same checking account 500; in a second step, an amount of $3,558.78 USD is instructed to be transferred into savings account 600c from checking account 500 in parallel with a transfer of $5,204.74 USD into savings account 600d from checking account 500. As described above, the transfers illustrated in the second step are subject to a second-step optimization algorithm as a check against a changed property of one or more of accounts 500, 600a, 600b, 600c, 600d, for example, a change in account limits, a change in the amount of financial assets disposed in an account, a change in the FDIC maximum insurance limit, and/or a change in interest rates associated with savings accounts 600a, 600b, 600c, 600d.

It will be understood that any point between or during any of the steps described above, product program 110 may provide to a user through client interface 200 information relating to the processes described above substantially in real-time or with any amount of delay, for example the status of each transfer, confirmation codes and/or numbers relating to a transfer of financial assets between any of the accounts described above.

It will be understood that the steps described above are exemplary according to the present disclosure, and are not intended to be limiting. A financial management network may include greater, fewer, and/or alternative steps to those disclosed above.

In embodiments, financial management system 1000 may be configured to implement a truncated, extended, and/or modified version of the optimization process described above, for example, so that different variables of the optimization algorithm may be optionally input by the user or by product program 110. In an exemplary embodiment, a user may designate an amount of financial assets to be optimally allocated into savings accounts 400a, 400b, and 400c from checking account 300. Accordingly, with additional reference to FIG. 4C, visual layer 114 may provide one or more inputs 119 to a user to designate such an amount of financial assets to be transferred, With reference to FIG. 6D, product program 110 may then proceed to optimize the distribution of the financial assets from checking account 300 designated by the user in the manner described above. In this manner, financial management system 1000 is configured to instruct an automated or intelligent transfer of funds from checking account 300 into savings accounts 400a, 400b, and/or 400c from checking 300 in an optimized manner.

In another embodiment, and with reference to FIG. 6C, a user may designate an amount of financial assets for product program 110 to instruct to be transferred from one or more of savings accounts 400a, 400b, 400c into checking account 300 in an optimized manner. In this manner, a user may directly supply to product program 110 the amount of financial assets to be transferred from one or more of savings accounts 400a, 400b, 400c into checking account 300, which may otherwise be determined by product program 110 as the "first-step" transfers in step S204 (FIG. 6A). Once a user has supplied the amount of financial assets to be instructed for transfer into checking account 300, product program 110 institutes steps S205a through S205e as shown in FIG. 6C.

Similarly, in another embodiment, and with reference to FIG. 6D, a user may designate an amount of financial assets for product program 110 to instruct to be transferred into one or more of savings accounts 400a, 400b, 400c from checking account 300 in an optimized manner. In this manner, a user may directly supply to product program 110 the amount of financial assets to be transferred into one or more of savings accounts 400a, 400b, 400c, from checking account 300 which may otherwise be determined by product program 110 as the "second-step" transfers in step S208 (FIG. 6A). Once a user has supplied the amount of financial assets to be instructed for transfer into savings accounts 400a, 400b, 400c, product program 110 institutes steps S208a through S208h as shown in FIG. 6D.

In another embodiment, the product program 110 determines an optimized distribution of financial assets across accounts 300, 400a, 400b, 400c, but does not automatically effect transfers of the funds through financial management network 100. Rather, a user may opt to implement the financial transfers necessary to achieve such a distribution without using financial management network 100, for example, by implementing one or more electronic funds transfers among accounts 300, 400a, 400b, 400c, by for example, ACH, wire transfer, credit transfer, or another modality of electronic funds transfer.

While the financial management network 100 in exemplary embodiments has been described as optimizing financial assets among accounts by having one checking account acting as the hub and multiple savings accounts on the spokes, by using the inventive concepts described herein, financial systems that have different hub-spoke configurations may also be implemented and the distribution of financial assets optimized among their accounts. For example, the financial management system 1000 may also include configurations in which there may be more than one account at the hub of the system.

For example, funds may be moved and optimized between a brokerage account and a checking account that both act as passive accounts forming the hub of the system and other accounts on the spokes that initiate transfers of funds into and request transfers of funds out from such two hub accounts. In such embodiment, the user may be able to set two different target balances for the respective checking and brokerage accounts.

Based on the inventive concepts disclosed herein, in such systems having two or more accounts at the hub, transfers may be effected automatically between these hub accounts as well as between the hub accounts and other accounts on the spokes of the financial management system 1000 to optimize the financial return among all of the accounts based upon requests initiated at the spoke accounts for transfers into and out of the hub accounts.

In other embodiments, transfers between the multiple hub accounts (for example, a checking account and a brokerage account) may be initiated automatically, or manually by a user, as a means of moving funds between the two hub accounts via transfers to and/or from the accounts on the spokes (for example, online savings accounts.) As a result of the inventive concept described herein, funds may be transferred out of one of the hub accounts in an amount that would otherwise exceed the daily transfer limits imposed by that account, since the transfer is effected as an ACH credit to the spoke account, rather than as an outbound transfer from the hub account.

In embodiments, transfers of financial funds may occur indirectly between savings accounts through an intermediary checking account as described above, or a user may opt, either within or without financial management network 100, to transfer financial assets directly between savings accounts without passing through a checking account. In such embodiments, ACH, or a modality of electronics fund transfer other than ACH, such as wire transfer or credit transfer, may be advantageous as wire transferred- or credit-transferred financial assets are processed substantially in real-time as compared to ACH, which typically occurs over a two-to-three day period. Because such transfers may be accompanied by a fee, such methods may be beneficial in embodiments where associated fees are relatively small relative to the amount of financial assets being transferred and the potential for enhanced interest income on these assets.

While this invention has been described in conjunction with the embodiments outlined above, many alternatives, modifications and variations will be apparent to those skilled in the art upon reading the foregoing disclosure. Accordingly, the exemplary embodiments of the invention, as set forth above, are intended to be illustrative, not limiting. Various changes may be made without departing from the spirit and scope of the invention, which is defined by the following claims.

What is claimed:

1. A method for permitting a third-party entity to gain access, in a secure manner, to an online account held by an account holder that is secured by a multi-factor authentication protocol, comprising the following steps performed by the third-party entity:

collecting the account holder's credentials;

encrypting the account holder's credentials using one or more processors;

storing the account holder's encrypted credentials using one or more processors, wherein the encrypted credentials are stored in a data store;

verifying the account holder's credentials by accessing, via one or more processors, the online account using the account holder's credentials;

receiving a multi-factor authentication request from the online account, the multi-factor authentication request indicating that a response is required from the account holder before further access to the online account is granted;

prompting the account holder for a response and receiving the response thereto from the account holder; and transmitting the account holder's response to the online account to satisfy the multi-factor authentication request.

2. The method of claim 1, further comprising the steps of:

storing one or more of the account holder's endpoints for the online account in a data store associated with the online account; and utilizing said one or more endpoints to permit the third-party to gain access to the online account, or information pertaining to the online account, without requiring a response by the account holder to any subsequent multi-factor authentication requests.

3. The method of claim 2, wherein the endpoint includes an email address or a phone number.

4. The method of claim 1, wherein the account holder's credentials are collected via a user interface.

5. The method of claim 1, wherein the account holder's credentials are collected from a data store.

6. A method for permitting a third-party entity to gain access, in a secure manner, to an online account held by an account holder that is secured by a multi-factor authentication protocol, comprising the following steps performed by the third-party entity:

collecting the account holder's credentials;

encrypting the account holder's credentials using one or more processors;

temporarily storing the account holder's encrypted credentials using one or more processors, wherein the encrypted credentials are held in memory;

verifying the account holder's credentials by accessing, via one or more processors, the online account using the account holder's credentials;

receiving a multi-factor authentication request from the online account, the multi-factor authentication request indicating that a response is required from the account holder before further access to the online account is granted;

prompting the account holder for a response and receiving the response thereto from the account holder; and transmitting the account holder's response to the online account to satisfy the multi-factor authentication request.

7. The method of claim 6, further comprising the steps of:

storing one or more of the account holder's endpoints for the online account in a data store associated with the online account; and utilizing said one or more endpoints to permit the third-party to gain access to the online account, or information pertaining to the online account, without requiring a response by the account holder to any subsequent multi-factor authentication requests.

8. The method of claim 7 wherein the endpoint includes an email address or a phone number.

9. The method of claim 6, wherein the account holder's credentials are collected via a user interface.

10. The method of claim 6, wherein the account holder's credentials are collected from a data store.

* * * * *